United States Patent
Karty et al.

(10) Patent No.: US 9,311,383 B1
(45) Date of Patent: Apr. 12, 2016

(54) OPTIMAL SOLUTION IDENTIFICATION SYSTEM AND METHOD

(71) Applicant: Affinnova, Inc., Waltham, MA (US)

(72) Inventors: Kevin D. Karty, Lincoln, MA (US); Kamal M. Malek, Weston, MA (US); David B. Teller, Cambridge, MA (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

(21) Appl. No.: 13/740,699

(22) Filed: Jan. 14, 2013

Related U.S. Application Data

(60) Provisional application No. 61/586,434, filed on Jan. 13, 2012.

(51) Int. Cl.
G06F 17/30 (2006.01)

(52) U.S. Cl.
CPC .............. *G06F 17/30595* (2013.01)

(58) Field of Classification Search
None
See application file for complete search history.

(56) References Cited

U.S. PATENT DOCUMENTS

| | | | |
|---|---|---|---|
| 4,115,761 A | 9/1978 | Ueda et al. | |
| 4,603,232 A | 7/1986 | Kurland et al. | |
| 4,908,761 A | 3/1990 | Tai | |
| 4,935,877 A | 6/1990 | Koza | |
| 5,041,972 A | 8/1991 | Frost | |
| 5,090,909 A | 2/1992 | Kellar et al. | |
| 5,124,911 A | 6/1992 | Sack | |
| 5,124,991 A | 6/1992 | Allen | |
| 5,222,192 A | 6/1993 | Shaefer | |
| 5,255,345 A | 10/1993 | Shaefer | |
| 5,299,115 A | 3/1994 | Fields et al. | |
| 5,375,195 A | 12/1994 | Johnston | |
| 5,400,248 A | 3/1995 | Chisholm | |
| 5,420,786 A | 5/1995 | Felthauser et al. | |
| 5,559,729 A | 9/1996 | Abe | |
| 5,583,763 A | 12/1996 | Atcheson et al. | |
| 5,608,424 A | 3/1997 | Takahashi et al. | |
| 5,615,341 A | 3/1997 | Agrawal et al. | |

(Continued)

FOREIGN PATENT DOCUMENTS

| | | |
|---|---|---|
| JP | 2001331627 | 11/2001 |
| JP | 2002015097 | 1/2002 |

(Continued)

OTHER PUBLICATIONS

"Chapter 7: Sampling in Market Research," retrieved from <http://web.archive.org/web/20050313042847/http://www.fao.org/docrep/w3241e/w3241e08.htm>, retrieved on Apr. 22, 2013 (29 pages).

(Continued)

*Primary Examiner* — Robert Beausoliel, Jr.
*Assistant Examiner* — Pedro J Santos
(74) *Attorney, Agent, or Firm* — Hanley, Flight & Zimmerman, LLC

(57) ABSTRACT

A method, computer program product, and computer system for receiving, at a computing device, data from at least one user, wherein at least a portion of the data is associated with the plurality of attribute variants. A variant relationship between one or more pairs of attribute variants of the plurality of attribute variants is determined based upon, at least in part, at least the portion of the data. The distance between the one or more pairs of objects is adjusted based upon, at least in part, the variant relationship between the one or more pairs of attribute variants of the plurality of attribute variants.

21 Claims, 14 Drawing Sheets

(56) References Cited

U.S. PATENT DOCUMENTS

| | | |
|---|---|---|
| 5,651,098 A | 7/1997 | Inoue et al. |
| 5,654,098 A | 8/1997 | Aono et al. |
| 5,687,369 A | 11/1997 | Li |
| 5,704,017 A | 12/1997 | Heckerman et al. |
| 5,717,865 A | 2/1998 | Stratmann |
| 5,724,567 A | 3/1998 | Rose et al. |
| 5,734,890 A | 3/1998 | Case et al. |
| 5,819,245 A | 10/1998 | Peterson et al. |
| 5,884,282 A | 3/1999 | Robinson |
| 5,893,098 A | 4/1999 | Peters et al. |
| 5,913,204 A | 6/1999 | Kelly |
| 5,918,014 A | 6/1999 | Robinson |
| 5,930,780 A | 7/1999 | Hughes et al. |
| 5,995,951 A | 11/1999 | Ferguson |
| 6,012,051 A | 1/2000 | Sammon, Jr. et al. |
| 6,029,139 A | 2/2000 | Cunningham et al. |
| 6,041,311 A | 3/2000 | Chislenko et al. |
| 6,064,980 A | 5/2000 | Jacobi et al. |
| 6,064,996 A | 5/2000 | Yamaguchi et al. |
| 6,070,145 A | 5/2000 | Pinsley et al. |
| 6,078,740 A | 6/2000 | DeTreville |
| 6,088,510 A | 7/2000 | Sims |
| 6,093,026 A | 7/2000 | Walker et al. |
| 6,115,700 A | 9/2000 | Ferkinhoff et al. |
| 6,125,351 A | 9/2000 | Kauffman |
| 6,151,585 A | 11/2000 | Altschuler et al. |
| 6,155,839 A | 12/2000 | Clark et al. |
| 6,167,445 A | 12/2000 | Gai et al. |
| 6,175,833 B1 | 1/2001 | West et al. |
| 6,202,058 B1 | 3/2001 | Rose et al. |
| 6,233,564 B1 | 5/2001 | Schulze, Jr. |
| 6,236,977 B1 | 5/2001 | Verba et al. |
| 6,249,714 B1 | 6/2001 | Hocaoglu et al. |
| 6,266,649 B1 | 7/2001 | Linden et al. |
| 6,281,651 B1 | 8/2001 | Haanpaa et al. |
| 6,304,861 B1 | 10/2001 | Ferguson |
| 6,366,890 B1 | 4/2002 | Usrey |
| 6,380,928 B1 | 4/2002 | Todd |
| 6,385,620 B1 | 5/2002 | Kurzius et al. |
| 6,438,579 B1 | 8/2002 | Hosken |
| 6,460,036 B1 | 10/2002 | Herz |
| 6,477,504 B1 | 11/2002 | Hamlin et al. |
| 6,546,380 B1 | 4/2003 | Lautzenheiser et al. |
| 6,574,585 B2 | 6/2003 | Caruso et al. |
| 6,629,097 B1 | 9/2003 | Keith |
| 6,636,862 B2 | 10/2003 | Lundahl et al. |
| 6,741,967 B1 | 5/2004 | Wu et al. |
| 6,754,635 B1 | 6/2004 | Hamlin et al. |
| 6,778,807 B1 | 8/2004 | Martino et al. |
| 6,826,541 B1 | 11/2004 | Johnston et al. |
| 6,839,680 B1 | 1/2005 | Liu et al. |
| 6,859,782 B2 | 2/2005 | Harshaw |
| 6,873,965 B2 | 3/2005 | Feldman et al. |
| 6,901,424 B1 | 5/2005 | Winn |
| 6,915,269 B1 | 7/2005 | Shapiro et al. |
| 6,934,748 B1 | 8/2005 | Louviere et al. |
| 6,944,514 B1 | 9/2005 | Matheson |
| 6,993,495 B2 | 1/2006 | Smith, Jr. et al. |
| 6,999,987 B1 | 2/2006 | Billingsley et al. |
| 7,016,882 B2 | 3/2006 | Afeyan et al. |
| 7,054,828 B2 | 5/2006 | Heching et al. |
| 7,058,590 B2 | 6/2006 | Shan |
| 7,114,163 B2 | 9/2006 | Hardin et al. |
| 7,177,851 B2 | 2/2007 | Afeyan et al. |
| 7,197,485 B2 | 3/2007 | Fuller |
| 7,233,914 B1 | 6/2007 | Wijaya et al. |
| 7,249,044 B2 | 7/2007 | Kumar et al. |
| 7,269,570 B2 | 9/2007 | Krotki |
| 7,281,655 B2 | 10/2007 | Wagner et al. |
| 7,302,475 B2 | 11/2007 | Gold et al. |
| 7,308,418 B2 | 12/2007 | Malek et al. |
| 7,337,127 B1 | 2/2008 | Smith et al. |
| 7,398,223 B2 | 7/2008 | Kahlert et al. |
| 7,610,249 B2 | 10/2009 | Afeyan et al. |
| 7,630,986 B1 | 12/2009 | Herz et al. |
| 7,711,580 B1 | 5/2010 | Hudson |
| 7,730,002 B2 | 6/2010 | Afeyan et al. |
| 7,877,346 B2 | 1/2011 | Karty |
| 7,912,898 B2 | 3/2011 | Gold et al. |
| 8,082,519 B2 | 12/2011 | Oron et al. |
| 8,103,540 B2 | 1/2012 | Gross |
| 8,150,795 B2 | 4/2012 | Montgomery, Jr. et al. |
| 8,234,152 B2 | 7/2012 | Jepson et al. |
| 8,868,448 B2 | 10/2014 | Freishtat et al. |
| 2001/0013009 A1 | 8/2001 | Greening et al. |
| 2002/0002482 A1 | 1/2002 | Thomas |
| 2002/0016731 A1 | 2/2002 | Kupersmit |
| 2002/0052774 A1 | 5/2002 | Parker et al. |
| 2002/0077881 A1 | 6/2002 | Krotki |
| 2002/0128898 A1 | 9/2002 | Smith, Jr. et al. |
| 2002/0133502 A1 | 9/2002 | Rosenthal et al. |
| 2002/0152110 A1 | 10/2002 | Stewart et al. |
| 2002/0161664 A1* | 10/2002 | Shaya et al. .......... 705/26 |
| 2003/0014291 A1 | 1/2003 | Kane et al. |
| 2003/0018517 A1 | 1/2003 | Dull et al. |
| 2003/0088458 A1 | 5/2003 | Afeyan et al. |
| 2003/0187708 A1 | 10/2003 | Baydar et al. |
| 2003/0233337 A1 | 12/2003 | Yanase et al. |
| 2004/0123247 A1 | 6/2004 | Wachen et al. |
| 2004/0133468 A1 | 7/2004 | Varghese |
| 2004/0181461 A1 | 9/2004 | Raiyani et al. |
| 2004/0199923 A1 | 10/2004 | Russek |
| 2004/0204957 A1 | 10/2004 | Afeyan et al. |
| 2004/0210471 A1 | 10/2004 | Luby et al. |
| 2004/0236625 A1 | 11/2004 | Kearon |
| 2004/0267604 A1 | 12/2004 | Gross |
| 2005/0060222 A1 | 3/2005 | White |
| 2005/0075919 A1 | 4/2005 | Kim |
| 2005/0131716 A1 | 6/2005 | Hanan et al. |
| 2005/0197988 A1 | 9/2005 | Bublitz |
| 2005/0203807 A1 | 9/2005 | Bezos et al. |
| 2005/0209909 A1 | 9/2005 | Dull et al. |
| 2005/0261953 A1* | 11/2005 | Malek et al. .......... 705/10 |
| 2006/0004621 A1 | 1/2006 | Malek et al. |
| 2006/0080265 A1 | 4/2006 | Hinds et al. |
| 2006/0080268 A1 | 4/2006 | Afeyan et al. |
| 2006/0106656 A1 | 5/2006 | Ouimet |
| 2006/0112099 A1 | 5/2006 | Musgrove et al. |
| 2006/0149616 A1 | 7/2006 | Hildick-Smith |
| 2006/0247956 A1 | 11/2006 | Rosen et al. |
| 2006/0259344 A1 | 11/2006 | Patel et al. |
| 2007/0067212 A1 | 3/2007 | Bonabeau |
| 2007/0192166 A1 | 8/2007 | Van Luchene |
| 2007/0203783 A1 | 8/2007 | Beltramo |
| 2007/0218834 A1 | 9/2007 | Yogev et al. |
| 2007/0222793 A1 | 9/2007 | Olhofer et al. |
| 2007/0226073 A1 | 9/2007 | Wang |
| 2007/0282666 A1 | 12/2007 | Afeyan et al. |
| 2008/0065471 A1 | 3/2008 | Reynolds et al. |
| 2008/0077901 A1 | 3/2008 | Arsintescu |
| 2008/0086364 A1 | 4/2008 | Hahn et al. |
| 2008/0091510 A1 | 4/2008 | Crandall et al. |
| 2008/0114564 A1 | 5/2008 | Ihara |
| 2008/0147483 A1* | 6/2008 | Ji .......... 705/10 |
| 2008/0243637 A1* | 10/2008 | Chan et al. .......... 705/27 |
| 2008/0306895 A1 | 12/2008 | Karty |
| 2009/0006184 A1 | 1/2009 | Leach et al. |
| 2009/0076887 A1 | 3/2009 | Spivack et al. |
| 2009/0150213 A1 | 6/2009 | Cyr et al. |
| 2009/0231356 A1 | 9/2009 | Barnes et al. |
| 2009/0234710 A1 | 9/2009 | Belgaied Hassine et al. |
| 2009/0254971 A1 | 10/2009 | Herz et al. |
| 2009/0282482 A1 | 11/2009 | Huston |
| 2009/0287728 A1 | 11/2009 | Martine et al. |
| 2009/0307055 A1 | 12/2009 | Karty |
| 2010/0010893 A1 | 1/2010 | Rajaraman et al. |
| 2010/0082441 A1 | 4/2010 | Doemling et al. |
| 2010/0125541 A1 | 5/2010 | Wendel et al. |
| 2010/0205034 A1 | 8/2010 | Zimmerman et al. |
| 2010/0306028 A1 | 12/2010 | Wagner |
| 2010/0313119 A1 | 12/2010 | Baldwin et al. |
| 2010/0318916 A1 | 12/2010 | Wilkins |
| 2011/0071874 A1 | 3/2011 | Schneersohn et al. |
| 2011/0087679 A1 | 4/2011 | Rosato et al. |

(56) References Cited

U.S. PATENT DOCUMENTS

| | | | |
|---|---|---|---|
| 2011/0125591 A1 | 5/2011 | Evans | |
| 2011/0261049 A1 | 10/2011 | Cardno et al. | |
| 2011/0302494 A1 | 12/2011 | Callery et al. | |
| 2012/0116843 A1 | 5/2012 | Karty | |
| 2012/0209723 A1 | 8/2012 | Satow et al. | |
| 2012/0229500 A1 | 9/2012 | Lamoureux et al. | |
| 2012/0232850 A1 | 9/2012 | Lamoureux et al. | |
| 2012/0232851 A1 | 9/2012 | Lamoureux et al. | |
| 2012/0232852 A1 | 9/2012 | Lamoureux et al. | |
| 2012/0233037 A1 | 9/2012 | Lamoureux et al. | |
| 2012/0259676 A1 | 10/2012 | Wagner | |
| 2013/0060662 A1* | 3/2013 | Carlson et al. | 705/26.61 |
| 2014/0279203 A1 | 9/2014 | Malek et al. | |
| 2014/0344013 A1 | 11/2014 | Karty et al. | |

FOREIGN PATENT DOCUMENTS

| | | |
|---|---|---|
| JP | 2002092291 | 3/2002 |
| JP | 2002117204 | 4/2002 |
| JP | 2002215870 | 8/2002 |
| JP | 2003030537 | 1/2003 |
| KR | 1020100082650 | 7/2010 |
| WO | 0002138 | 1/2000 |
| WO | 02057986 | 7/2002 |
| WO | 2005116896 | 12/2005 |
| WO | 2006012122 | 2/2006 |
| WO | 2008022341 | 2/2008 |
| WO | 2010055017 | 5/2010 |
| WO | 2014143729 | 9/2014 |

OTHER PUBLICATIONS

"Sampling Techniques," Oct. 2003, retrieved from <http://web.archive.org/web/20031031223726/http://cs.fit.edu/~jpmcgee/classes/CSE5800/SamplingTechniques.pdf>, retrieved on Apr. 22, 2013 (12 pages).

Adomavicius et al., "Toward the Next Generation of Recommender Systems: A Survey of the State-of-the-Art and Possible Extensions," IEEE Transactions on Knowledge and Data Engineering, vol. 17, No. 6, Jun. 2005, pp. 734-749 (16 pages).

Anthony, Cynthia S., "Electronic Monitoring Legislation for Businesses with Call Centers is Fraught with Problems," Telecommunications, ABI/INFORM Global, vol. 28, No. 3, Mar. 1994 (1 page).

Arsham, Hossein, "Questionnaire Design and Surveys Sampling," Mar. 4, 2004, retrieved from <http://web.archive.org/web/20040304232826/http://home.ubalt.edu/ntsbarsh/statdata/Surveys.htm>, retrieved on Apr. 22, 2013 (15 pages).

Balakrishnan et al., "Genetic Algorithm for Product Design," Management Science, vol. 42, No. 8, Aug. 1996, pp. 1105-1117 (13 pages).

Bartlett II, et al., "Organizational Research: Determining Appropriate Sample Size in Survey Research," Information Technology, Learning, and Performance Journal, vol. 19, No. 1, Spring 2001, pp. 43-50 (8 pages).

Bonabeau, Eric, "Agent-Based Modeling: Methods and Techniques for Simulating Human Systems," PNAS, vol. 99, Supplement 3, May 14, 2002, retrieved from <http://www.pnas.org/cgi/doi/10.1073/pnas.082080899> (8 pages).

Borgatti, Stephen P., "Multi-Dimensional Scaling," 1997, retrieved from http://www.analytictech.com/borgatti/mds.htm>, retrieved on Sep. 8, 2010 (8 pages).

Brown et al., "Restricted Adaptive Cluster Sampling," Environmental and Ecological Statistics, vol. 5, 1998, pp. 49-63 (15 pages).

Buja et al., "Interactive Data Visualization with Multi-Dimensional Scaling," Mar. 29, 2004 (32 pages).

Cabena et al., "Intelligent Miner for Data Applications Guide," IBM, Redbook, SG24-5252-00, Mar. 1999 (175 pages). (NPL in 2 parts).

Callery et al., "Smart Presentation Application," U.S. Appl. No. 61/351,486, filed Jun. 4, 2010, as incorporated by reference in U.S. PG Publication 2011/0302494 (50 pages).

Canadian Intellectual Property Office, "Examiner's Report," issued in connection with Canadian Patent Application No. 2,428,079, mailed Sep. 8, 2014 (2 pages).

Canadian Intellectual Property Office, "Examiner's Report," issued in connection with Canadian Patent Application No. 2,566,943, mailed Oct. 17, 2013 (4 pages).

Cattin et al., "Commercial Use of Conjoint Analysis: A Survey," Journal of Marketing, vol. 46, Summer 1982, pp. 44-53 (8 pages).

Chen, Doris Tung, "Network Monitoring and Analysis in a Large Scale PACS and Teleradiology Environment," AAT 9620717, University of California, 1996, Abstract Only, Abstract retrieved from <http://proquest.umi.com/pqdweb?index=3&did=74184...D&RQT=309&VName=PQD&TS=1235762960&clientId=19649>, retrieved on Feb. 27, 2009 (2 pages).

Cheng et al., "Testing for IIA in the Multi-Nomial Logit Model," Sociological Methods & Research, vol. 35, No. 4, May 2007 (19 pages).

Dahan et al., "The Predictive Power of Internet-Based Product Concept Testing Using Visual Depiction and Animation," Journal of Production Innovation Management, vol. 17, 2000, pp. 99-109 (11 pages).

Desmond et al., "Smart Office Tools Presentation," IBM Research, Oct. 18, 2010, retrieved from <http://ics.uci.edu/'nlopezgi/flexitools/presentations/desmond_flexitools_splash2010.pdf> (22 pages).

Desmond et al., "Towards Smart Office Tools," 2010, retrieved from <http://http://www.ics.uci.edu/~nlopezgi/flexitools/papers/desmond_flexitools_splash2010.pdf> (4 pages).

DSS Research, "A Review of Conjoint Analysis," DSS Research, retrieved from <http://www.conjoint.com/CR01.aspx>, retrieved on Feb. 26, 2015 (6 pages).

Ellis et al., "Comparing Telephone and Fact-to-Face Surveys in Terms of Sample Representativeness: A Meta-Analysis of Demographic Characteristics," Ohio State University, Apr. 1999 (61 pages).

Environmental Protection Agency, "Guidance on Choosing a Sampling Design for Environmental Data Collection," EPA QA/G-55, Dec. 2002 (178 pages). (NPL in 2 parts).

European Patent Office, "Notice from the European Patent Office," Official Journal of the European Patent Office, vol. 30, No. 11, Nov. 1, 2007, pp. 592-593, XP0007905525 ISSN: 0170-9291 (2 pages).

European Patent Office, "Supplemental Search Report," issued in connection with European Patent Application No. 05753821.7, mailed Dec. 17, 2009 (2 pages).

European Patent Office, "Proceeding further with the European patent application pursuant to Rule 70(2) EPC," issued in connection with European Patent Application No. 05753821.7, mailed Jan. 4, 2010 (1 page).

European Patent Office, "Communication Pursuant to Article 94(3) EPC," issued in connection with European Patent Application No. 05753821.7, mailed Feb. 5, 2013 (5 pages).

European Patent Office, "Extended European Search Report," issued in connection with European Patent No. 10001340.8, May 31, 2010 (4 pages).

European Patent Office, "Communication Pursuant to Article 94(3) EPC," issued in connection with European Patent Application No. 10001340.8, mailed Mar. 31, 2011 (5 pages).

European Patent Office, Summons to Attend Oral Proceedings Pursuant to Rule 115(1) EPC, issued in connection with European Patent Application No. 10001340.8, Feb. 10, 2012 (6 pages).

Fader et al., "Modeling Consumer Choice Among SKU's," Journal of Marketing Research, vol. 33, No. 4, Nov. 1996 (12 pages).

Fienberg, Stephen E. "Notes on Stratified Sampling (for Statistics 36-303: Sampling, Surveys and Society)," Department of Statistics, Carnegie Mellon University, Mar. 12, 2003 (12 pages).

Fly, "Swap an Image in PowerPoint 2007 with Ease," CGI Interactions, Dec. 23, 2010, retrieved from <http://cgiinteractive.com/blog2010/12/swap-change-image-powerpoint-2007-ease/feed/> (3 pages).

Garcia, Fernando D.,"Computer Screen Design Aided by a Genetic Algorithm," Late Breaking Papers at the 2000 Genetic and Evolutionary Computation Conference, Whitley, D. ed. 2000, pp. 98-101 (4 pages).

(56) References Cited

OTHER PUBLICATIONS

Government of India Patent Office, "First Examination Report," issued in connection with Indian Patent Application No. 3684/KOLNP/2006, mailed Mar. 14, 2011 (2 pages).
Graf et al., "Interactive Evolution of Images," Evolutionary Programming IV-Proc. Fourth Annual Conference-Evolutionary Programming, MIT Press, Cambridge MA, 1995, pp. 53-65 (13 pages).
Gu et al., "Sampling and Its Application in Data Mining: A Survey," National University of Singapore, Singapore, Jun. 1, 2000 (31 pages).
Gu et al., "Sampling: Knowing Whole From its Part," Instance Selection and Construction for Data Mining, Chapter 2, May 2, 2001 (32 pages).
Guadagni et al., "A Logit Model of Brand Choice Calibrated on Scanner Data," Marketing Science, vol. 2, No. 3, Summer 1983, pp. 203-238 (37 pages).
Haupt et al., Practical Genetic Algorithms, 1998, pp. 66-70 and 85-88 (10 pages).
Huber et al., "Market Boundaries and Product Choice: Illustrating Attraction and Substitution Effects," Journal of Consumer Research, Inc., vol. 10, No. 1, Jun. 1983 (15 pages).
International Searching Authority, "International Search Report and Written Opinion," issued in connection with International Patent Application No. PCT/US2010/049645, mailed Feb. 28, 2011 (7 pages).
International Searching Authority, "International Preliminary Report on Patentability," issued in connection with International Patent Application No. PCT/US2010/049645, mailed Mar. 27, 2012 (6 pages).
International Searching Authority, "International Preliminary Report on Patentability," issued in connection with International Patent Application No. PCT/US2001/51284, mailed Sep. 29, 2008 (3 pages).
International Searching Authority, "International Preliminary Report on Patentability," issued in connection with International Patent Application No. PCT/US2005/021948, mailed Jan. 9, 2007 (8 pages).
International Searching Authority, "International Search Report," issued in connection with International Patent Application No. PCT/US2005/021948, mailed Nov. 13, 2006 (2 pages).
International Searching Authority, Written Opinion, issued in connection with International Patent Application No. PCT/US2005/021948, mailed Nov. 13, 2006 (7 pages).
International Searching Authority, "International Preliminary Report on Patentability," issued in connection with International Patent Application No. PCT/US2005/17179, mailed Jan. 30, 2007 (4 pages).
International Searching Authority, "International Search Report," issued in connection with International Patent Application No. PCT/US2005/17179, mailed Jan. 16, 2007 (4 pages).
International Searching Authority, "Written Opinion," issued in connection with International Patent Application No. PCT/US2005/17179, mailed Jan. 16, 2007 (3 pages).
International Searching Authority, "Written Opinion," issued in connection with International Patent Application No. PCT/US2012/028364, mailed Jul. 11, 2012 (4 pages).
International Searching Authority, "International Search Report," issued in connection with International Patent Application No. PCT/US2012/028364, mailed Jul. 11, 2012 (4 pages).
International Searching Authority, "International Search Report," issued in connection with International Patent Application No. PCT/US2012/028369, mailed Jul. 11, 2012 (4 pages).
International Searching Authority, "International Preliminary Report on Patentability," issued in connection with International Patent Application No. PCT/US2012/028369, mailed Sep. 10, 2013 (6 pages).
International Searching Authority, "Written Opinion," issued in connection with International Patent Application No. PCT/US2012/028369, mailed Jul. 11, 2012 (5 pages).
International Searching Authority, "International Preliminary Report on Patentability," issued in connection with International Patent Application No. PCT/US2012/028373, mailed Sep. 10, 2013 (6 pages).
International Searching Authority, "International Search Report," issued in connection with International Patent Application No. PCT/US2012/028373, mailed Jul. 6, 2012 (4 pages).
International Searching Authority, "Written Opinion," issued in connection with International Patent Application No. PCT/US2012/028373, mailed Jul. 6, 2012 (5 pages).
International Searching Authority, "Written Opinion," issued in connection with International Patent Application No. PCT/US2012/028375, mailed Jul. 6, 2012 (5 pages).
International Searching Authority, "International Preliminary Report on Patentability," issued in connection with International Patent Application No. PCT/US2012/028375, mailed Sep. 10, 2013 (6 pages).
International Searching Authority, "International Search Report," issued in connection with International Patent Application No. PCT/US2012/028375, mailed Jul. 6, 2012 (4 pages).
International Searching Authority, "International Preliminary Report on Patentability," issued in connection with International Patent Application No. PCT/US2012/028376, mailed Sep. 10, 2013 (7 pages).
International Searching Authority, "International Search Report," issued in connection with International Patent Application No. PCT/US2012/028376, mailed Jul. 9, 2012 (4 pages).
International Searching Authority, "Written Opinion," issued in connection with International Patent Application No. PCT/US2012/028376, mailed Jul. 9, 2012 (5 pages).
iStockphoto, "iStockphoto Announces Plug-in That Allows Users of Microsoft PowerPoint and Word to Download iStock Photos and Illustrations Directly into Presentations and Documents," iStockphoto, retrieved from <http://www.istockphoto.com/istockphoto-office-ribbon>, May 17, 2010 (4 pages).
Jacobs, Richard M., "Educational Research: Sampling a Population," EDU 8603, 2003 (89 pages).
Japan Patent Office, "Notice of Reasons for Rejection," issued in connection with Japanese Patent Application No. P2013-236441, mailed Feb. 25, 2015 (4 pages).
Johnston, Why We Feel: The Science of Human Emotions, Perseus Books, Cambridge MA, 1999, pp. 152-155 (5 pages).
Kahn et al., "Modeling Choice Among Assortments," Journal of Retailing, vol. 67, No. 3, Fall 1991 (26 pages).
Kaye et al., "Research Methodology: Taming the Cyber Frontier-Techniques for Improving Online Surveys," Social Science Computer Review, vol. 17, No. 3, Fall 1999, pp. 323-337 (16 pages).
Kim et al., "Application of Interactive Genetic Algorithm to Fashion Design," Engineering Applications of Artificial Intelligence, vol. 13, 2000, pp. 635-644 (10 pages).
Kim et al., "Knowledge-Based Encoding in Interactive Genetic Algorithm for a Fashion Design Aid System," Genetic and Evolutionary Computation Conference, Jul. 10-12, 2000, pp. 757 (4 pages).
Koppelmann et al, "The Paired Combinatorial Logit Model: Properties, Estimation and Application," Transportation Research Part B, vol. 34, 2000 (15 pages).
Lunsford et al., "Research Forum—The Research Forum Sample-Part 1: Sampling," Journal of Prosthetics and Orthotics, vol. 7, No. 3, 1995, retrieved from <http://www.oandp.org/jpo/library/printArticle.asp?printArticleId=1995_03_105>, retrieved on Feb. 26, 2015 (10 pages).
Medina, Martin Humberto Felix, Contributions to the Theory of Adaptive Sampling, Doctorate Thesis in Statistics, The Pennsylvania State University, Dec. 2000 (259 pages). (NPL in 2 parts).
O'Reilly et al., "A Preliminary Investigation of Evolution as a Form Design Strategy," Artificial Life VI, MIT Press, Cambridge MA, 1998 (5 pages).
O'Reilly et al., "Evolution as a Design Strategy for Nonlinear Architecture: Generative Modeling of 3D Surfaces," 1998 (10 pages).
Ossher et al., "Flexible Modeling Tools for Pre-Requirements Analysis: Conceptual Architecture and Research Challenges," ACM SIGPLAN Notices—OOPSLA-10, vol. 45, Issue 10, Oct. 2010, pp. 848-864 (17 pages).

(56) References Cited

OTHER PUBLICATIONS

Ossher et al., "Using Tagging to Identify and Organize Concerns During Pre-Requirements Analysis," Aspect-Oriented Requirements Engineering and Architecture Design, 2009, EA'09, ICSE Workshop, May 18, 2009, pp. 25-30 (6 pages).
Pazzani, Michael J., "A Framework for Collaborative, Content-Based and Demographic Filtering," Artificial Intelligence Review, vol. 13, 2000, pp. 393-408 (16 pages).
Reynolds, Reid T. "How Big is Big Enough?" American Demographics, Abstract Only, vol. 2, No. 4, Apr. 1980, Abstract retrieved from <http://search.proquest.com/printviewfile?accountid=14753>, retrieved on Apr. 22, 2013 (2 pages).
Riedesel, Paul, "A Brief Introduction to Discrete Choice Analysis in Marketing Research," Action Marketing Research, 1996, retrieved from <http://www.action-research.com/discrete.html>, retrieved on Jan. 16, 2009 (8 pages).
Rowland, Duncan Andrew, "Computer Graphic Control Over Human Face and Head Appearance, Genetic Optimization of Perceptual Characteristics," Ph.D. Thesis, University of St. Andrews, Scotland, Jan. 5, 1998, retrieved from <http://www.mindlab.msu.edu/documents/Thesis_Rowland/title.htm>, retrieved on May 12, 2000 (106 pages).
Sage Publishing, "Chapter 5: Sampling," retrieved from <http://sagepub.com/upm-data/24480_Ch5.pdf>, pp. 148-189 (42 pages).
Sims, Karl, "Artificial Evolution for Computer Graphics," Computer Graphics, vol. 25, No. 4, Jul. 1991, pp. 319-328 (22 pages).
Sinha et al., "Attribute Drivers: A Factor Analytic Choice Map Approach for Understanding Choices Among SKUs," Marketing Science, vol. 24, No. 3, Summer 2005, pp. 351-366 (17 pages).
Steiner et al., "A Probabilistic One-Step Approach to the Optimal Product Line Design Problem Using Conjoint and Cost Data," Review of Marketing Science Working Papers, vol. 1, No. 4, Working Paper 4, 2002, pp. 1-40 (41 pages).
Su et al., "An Internet-Based Negotiation Server for E-Commerce," The VLDB Journal—The International Journal on Very Large Data Bases, vol. 10, Issue 1, Aug. 2001, pp. 72-90 (20 pages).
Swain et al., "Webseer: an Image Search Engine for the World Wide Web," Technical Report, University of Chicago, 1996 retrieved from <http://citeseerx.ist.psu.edu/viewdoc/download?doi=10.1.1.44.9234&revrep1&type=pdf> (8 pages).
Thompson, Steven K., "Design and Inference in Adaptive Sampling," SSC Annual Meeting, Proceedings of the Survey Methods Section, Jun. 1997 (5 pages).
Thompson, Steven K., "Stratified Adaptive Cluster Sampling," Abstract Only, Biometrika, vol. 78, No. 2, 1991 (1 page).
United States Patent and Trademark Office, "Non-Final Office Action" issued in connection with U.S. Appl. No. 13/081,924, mailed Jan. 15, 2014 (19 pages).
United States Patent and Trademark Office, "Final Office Action" issued in connection with U.S. Appl. No. 13/081,924, mailed Sep. 12, 2013 (19 pages).
United States Patent and Trademark Office, "Non-Final Office Action" issued in connection with U.S. Appl. No. 13/081,924, mailed Feb. 28, 2013 (15 pages).
United States Patent and Trademark Office, "Final Office Action" issued in connection with U.S. Appl. No. 13/081,924, mailed Jun. 5, 2014 (19 pages).
United States Patent and Trademark Office, "Non-Final Office Action" issued in connection with U.S. Appl. No. 12/476,806, mailed Oct. 7, 2011 (15 pages).
United States Patent and Trademark Office, "Final Office Action" issued in connection with U.S. Appl. No. 12/476,806, mailed Aug. 16, 2012 (17 pages).
United States Patent and Trademark Office, "Non-Final Office Action" issued in connection with U.S. Appl. No. 12/476,806, mailed May 1, 2014 (21 pages).
United States Patent and Trademark Office, "Non-Final Office Action" issued in connection with U.S. Appl. No. 12/476,806, mailed Dec. 1, 2014 (21 pages).
United States Patent and Trademark Office, "Non-Final Office Action" issued in connection with U.S. Appl. No. 12/887,027, mailed Apr. 27, 2012 (9 pages).
United States Patent and Trademark Office, "Final Office Action" issued in connection with U.S. Appl. No. 12/887,027, mailed Apr. 11, 2013 (30 pages).
United States Patent and Trademark Office, "Non-Final Office Action" issued in connection with U.S. Appl. No. 12/887,027, mailed Jan. 15, 2015 (16 pages).
United States Patent and Trademark Office, "Non-Final Office Action" issued in connection with U.S. Appl. No. 12/368,028, mailed Nov. 26, 2013 (37 pages).
United States Patent and Trademark Office, "Non-Final Office Action" issued in connection with U.S. Appl. No. 12/368,028, mailed Mar. 19, 2013 (33 pages).
United States Patent and Trademark Office, "Non-Final Office Action" issued in connection with U.S. Appl. No. 12/368,028, mailed Jun. 8, 2011 (16 pages).
United States Patent and Trademark Office, "Advisory Action" issued in connection with U.S. Appl. No. 12/368,028, mailed Sep. 29, 2014 (3 pages).
United States Patent and Trademark Office, "Final Office Action" issued in connection with U.S. Appl. No. 12/368,028, mailed Aug. 14, 2013 (34 pages).
United States Patent and Trademark Office, "Final Office Action" issued in connection with U.S. Appl. No. 12/368,028, mailed Apr. 16, 2014 (39 pages).
United States Patent and Trademark Office, "Final Office Action" issued in connection with U.S. Appl. No. 12/368,028, mailed Jan. 18, 2012 (32 pages).
United States Patent and Trademark Office, "Non-Final Office Action," issued in connection with U.S. Appl. No. 11/758,877, mailed Mar. 8, 2010 (25 pages).
United States Patent and Trademark Office, "Supplemental Notice of Allowance," issued in connection with U.S. Appl. No. 10/852,356, mailed Oct. 22, 2007 (3 pages).
United States Patent and Trademark Office, "Supplemental Notice of Allowance," issued in connection with U.S. Appl. No. 10/852,356, mailed Sep. 4, 2007 (3 pages).
United States Patent and Trademark Office, "Notice of Allowance," issued in connection with U.S. Appl. No. 11/758,877, mailed Sep. 22, 2010 (6 pages).
United States Patent and Trademark Office, "Notice of Allowance," issued in connection with U.S. Appl. No. 10/852,356, mailed Jul. 19, 2007 (22 pages).
United States Patent and Trademark Office, "Non-Final Office Action," issued in connection with U.S. Appl. No. 10/852,356, mailed Jan. 3, 2007 (11 pages).
United States Patent and Trademark Office, "Non-Final Office Action," issued in connection with U.S. Appl. No. 10/053,353, mailed Feb. 18, 2005 (10 pages).
United States Patent and Trademark Office, "Non-Final Office Action," issued in connection with U.S. Appl. No. 10/053,353, mailed Oct. 17, 2005 (9 pages).
United States Patent and Trademark Office, "Notice of Allowance," issued in connection with U.S. Appl. No. 10/053,353, mailed Nov. 8, 2006 (6 pages).
United States Patent and Trademark Office, "Non Final Office Action," issued in connection with U.S. Appl. No. 10/831,881, mailed Jan. 6, 2005 (10 pages).
United States Patent and Trademark Office, "Notice of Allowance," issued in connection with U.S. Appl. No. 10/831,881, mailed Aug. 4, 2005 (7 pages).
United States Patent and Trademark Office, "Notice of Allowance," issued in connection with U.S. Appl. No. 11/229,020, mailed Mar. 17, 2009 (36 pages).
United States Patent and Trademark Office, "Notice of Allowance," issued in connection with U.S. Appl. No. 11/726,350, mailed Jul. 13, 2009 (10 pages).
United States Patent and Trademark Office, "Non-Final Office Action," issued in connection with U.S. Appl. No. 13/282,321, mailed Jul. 2, 2012 (40 pages).

(56) References Cited

OTHER PUBLICATIONS

United States Patent and Trademark Office, "Final Office Action," issued in connection with U.S. Appl. No. 13/282,321, mailed Feb. 22, 2013 (47 pages).
United States Patent and Trademark Office, "Non-Final Office Action," issued in connection with U.S. Appl. No. 13/283,121, mailed Sep. 20, 2012 (59 pages).
United States Patent and Trademark Office, "Final Office Action," issued in connection with U.S. Appl. No. 13/283,121, mailed May 24, 2013 (69 pages).
United States Patent and Trademark Office, "Final Office Action," issued in connection with U.S. Appl. No. 13/283,495, mailed Jan. 27, 2015 (34 pages).
United States Patent and Trademark Office, "Non-Final Office Action," issued in connection with U.S. Appl. No. 13/283,495, mailed Jul. 10, 2012 (39 pages).
United States Patent and Trademark Office, "Non-Final Office Action," issued in connection with U.S. Appl. No. 13/283,495, mailed Sep. 19, 2013 (50 pages).
United States Patent and Trademark Office, "Final Office Action," issued in connection with U.S. Appl. No. 13/283,495, mailed Feb. 11, 2013 (46 pages).
Weinberger, Martin, "Getting the Quota Sample Right, Journal of Advertising Research," vol. 13, No. 5, Oct. 1973, pp. 69-72 (5 pages).
Wempen, Faithe, Microsoft PowerPoint 2010 Bible, Wiley Publishing, Inc., May 10, 2010 (819 pages). (NPL in 6 parts).
Wen et al., The Generalized Nested Logit Model, Transportation Research Part B, 35, 2001 (15 pages).
Wikipedia, "Estimation Theory," Feb. 13, 2011, retrieved from <http://en.wikipedia.org/w/index.php?title=Estimation_theory&printable>, retrieved on Mar. 15, 2011.
Wikipedia, "Independence of Irrelevant Alternatives," Jan. 18, 2011, retrieved from <http://en.wikipedia.org/w/index.php?title=Independence_of_irrelevant_alternatives>, retrieved on Feb. 15, 2011 (7 pages).
Wikipedia, "Multinomial Logit," Feb. 4, 2011, retrieved from <http://en.wikipedia/org/w/index.php?title=Multinomial_logit&printable>, retrieved on Feb. 15, 2011 (3 pages).
Wikipedia, "Goodness of Fit," Jan. 22, 2011, retrieved from <http://en.wikipedia.org/w/index.php?title=Goodness_of_fit&printable>, retrieved on Mar. 15, 2011 (4 pages).
Wikipedia, "Sampling (statistics)," Oct. 24, 2005, retrieved from <http://en.wikipedia.org/wiki/Sampling_(statistics)>, retrieved on Oct. 26, 2005 (5 pages).
Wikipedia, "Revision history of Agent-based model," retrieved from <http://en.wikipedia.org/w/index.php?title=Agent-based_model&dir=prev>, retrieved on Jan. 21, 2009 (1 page).
Wikipedia, "Agent-based model," Jan. 18, 2009, retrieved from <http://en.wikipedia.org/w/index.php?title=Agent-based_model&printable=yes>, retrieved on Jan. 21, 2009 (7 pages).
Witbrock et al., "Evolving Genetic Art," Evolutionary Design by Computers, 1999, pp. 251-259 (9 pages).
United States Patent and Trademark Office, "Non-Final Office Action" issued in connection with U.S. Appl. No. 14/559,084, mailed Mar. 11, 2015 (16 pages).
United States Patent and Trademark Office, "Examiner's Answer to Appeal Brief," issued in connection with U.S. Appl. No. 12/368,028, mailed Apr. 21, 2015 (16 pages).
United States Patent and Trademark Office, "Final Office Action" issued in connection with U.S. Appl. No. 12/476,806, mailed Jun. 30, 2015 (21 pages).
United States Patent and Trademark Office, "Final Office Action" issued in connection with U.S. Appl. No. 14/559,084, mailed Jul. 17, 2015 (8 pages).
Canadian Intellectual Property Office, "Examiner's Report," issued in connection with Canadian Patent Application No. 2,566,943, mailed Aug. 12, 2015 (6 pages).
European Patent Office, "Extended European Search Report," issued in connection with European Patent Application No. 13151891.2, mailed Sep. 27, 2013 (5 pages).
International Searching Authority, "International Search Report and Written Opinion," issued in connection with International Patent Application No. PCT/US2014/026808, mailed Jun. 26, 2014 (10 pages).
International Searching Authority, "International Preliminary Report on Patentability," issued in connection with International Patent Application No. PCT/US2014/026808, mailed Sep. 24, 2015 (7 pages).
International Searching Authority, "International Preliminary Report on Patentability," issued in connection with International Patent Application No. PCT/US2014/027812, mailed Sep. 24, 2015 (7 pages).
International Searching Authority, "International Search Report and Written Opinion," issued in connection with International Patent Application No. PCT/US2014/027812, mailed Jul. 24, 2014 (10 pages).
Terano et al., "Marketing Data Analysis Using Inductive Learning and Genetic Algorithms with Interactive- and Automated-Phases," Evolutionary Computation, 1995, IEEE International Conference on Perth, vol., Nov. 29, 1995 (6 pages).
United States Patent and Trademark Office, "Final Office Action," issued in connection with U.S. Appl. No. 12/887,027, mailed Oct. 8, 2015 (21 pages).
Canadian Intellectual Property Office, "Office Action," issued in connection with Application No. 2,428,079, Oct. 26, 2015, 3 pages.
United States Patent and Trademark Office, "Non-Final Office Action," issued in connection with U.S. Appl. No. 13/283,495, Nov. 23, 2015, 82 pages.
Geyer-Schulz, "On Learning in a Fuzzy Rule-Based Expert System," Supplement to Kybernetika vol. 28, 1992, 4 pages.

\* cited by examiner

Population of Genomes Representing
Alternative Product Forms in an IEA

500 — Brand    502 — Flavor

Product Form A: | Brand 1 | Flavor 1 |
Product Form B: | Brand 2 | Flavor 1 |
Product Form C: | Brand 3 | Flavor 1 |
Product Form D: | Brand 3 | Flavor 2 |
Product Form E: | Brand 3 | Flavor 3 |
Product Form F: | Brand 3 | Flavor 3 |

FIG. 5

Initial Distance Between Genomes (Hamming Distance)

| | A | B | C | D | E | F |
|---|---|---|---|---|---|---|
| A | 0 | | | | | |
| B | 1 | 0 | | | | |
| C | 1 | 1 | 0 | | | |
| D | 2 | 2 | 1 | 0 | | |
| E | 2 | 2 | 1 | 1 | 0 | |
| F | 2 | 2 | 1 | 1 | 0 | 0 |

Product Form

Product Form

Distance Between Genomes, Adjusted for Relative Attribute Importance
(30% Brand, 70% Flavor)

|   | A | B | C | D | E | F |
|---|---|---|---|---|---|---|
| A | 0.00 | | | | | |
| B | 0.30 | 0.00 | | | | |
| C | 0.30 | 0.30 | 0.00 | | | |
| D | 1.00 | 1.00 | 0.70 | 0.00 | | |
| E | 1.00 | 1.00 | 0.70 | 0.70 | 0.00 | |
| F | 1.00 | 1.00 | 0.70 | 0.70 | 0.00 | 0.00 |

Product Form

Variant Correlation Matrix

| | | Attribute 1: Brand | | | Attribute 2: Flavor | | | |
|---|---|---|---|---|---|---|---|---|
| | | Variant 1: Brand 1 | Variant 2: Brand 2 | Variant 3: Brand 3 | Variant 1: Flavor 1 | Variant 2: Flavor 2 | Variant 3: Flavor 3 | Variant 4: Flavor 4 |
| Attribute 1: Brand | Variant 1: Brand 1 | 1 | -0.138 | -0.182 | ... | | | |
| | Variant 2: Brand 2 | -0.138 | 1 | 0.348 | | | | |
| | Variant 3: Brand 3 | -0.182 | 0.348 | 1 | | | | |
| Attribute 2: Flavor | Variant 1: Flavor 1 | ... | | | 1 | 0.051 | -0.278 | -0.558 |
| | Variant 2: Flavor 2 | | | | 0.051 | 1 | -0.452 | -0.368 |
| | Variant 3: Flavor 3 | | | | -0.278 | -0.452 | 1 | 0.214 |
| | Variant 4: Flavor 4 | | | | -0.558 | -0.368 | 0.214 | 1 |

Variant Similarity Matrix

| | Attribute1: Brand ||| Attribute 2: Flavor ||||
|---|---|---|---|---|---|---|---|
| | Variant 1: Brand 1 | Variant 2: Brand 2 | Variant 3: Brand 3 | Variant 1: Flavor 1 | Variant 2: Flavor 2 | Variant 3: Flavor 3 | Variant 4: Flavor 4 |
| Attribute1: Brand — Variant 1: Brand 1 | 1 | 0.000 | 0.000 | | | | |
| Variant 2: Brand 2 | 0.000 | 1 | 0.216 | | *** | | |
| Variant 3: Brand 3 | 0.000 | 0.216 | 1 | | | | |
| Attribute 2: Flavor — Variant 1: Flavor 1 | | | | 1 | 0.023 | 0.000 | 0.000 |
| Variant 2: Flavor 2 | | *** | | 0.023 | 1 | 0.000 | 0.000 |
| Variant 3: Flavor 3 | | | | 0.000 | 0.000 | 1 | 0.129 |
| Variant 4: Flavor 4 | | | | 0.000 | 0.000 | 0.129 | 1 |

Variant Distance Matrix

| | Attribute 1: Brand | | | Attribute 2: Flavor | | | |
|---|---|---|---|---|---|---|---|
| | Variant 1: Brand 1 | Variant 2: Brand 2 | Variant 3: Brand 3 | Variant 1: Flavor 1 | Variant 2: Flavor 2 | Variant 3: Flavor 3 | Variant 4: Flavor 4 |
| Attribute 1: Brand Variant 1: Brand 1 | 0 | 1.000 | 1.000 | | | ... | |
| Variant 2: Brand 2 | 1.000 | 0 | 0.784 | | | | |
| Variant 3: Brand 3 | 1.000 | 0.784 | 0 | | | | |
| Attribute 2: Flavor Variant 1: Flavor 1 | | | | 0 | 0.977 | 1.000 | 1.000 |
| Variant 2: Flavor 2 | | ... | | 0.977 | 0 | 1.000 | 1.000 |
| Variant 3: Flavor 3 | | | | 1.000 | 1.000 | 0 | 0.871 |
| Variant 4: Flavor 4 | | | | 1.000 | 1.000 | 0.871 | 0 |

Distance Between Genomes, Adjusted for Variant Distance

Product Form

| | A | B | C | D | E | F |
|---|---|---|---|---|---|---|
| A | 0.000 | | | | | |
| B | 1.000 | 0.000 | | | | |
| C | 1.000 | 0.784 | 0.000 | | | |
| D | 1.977 | 1.761 | 0.977 | 0.000 | | |
| E | 2.000 | 1.784 | 1.000 | 1.000 | 0.000 | |
| F | 2.000 | 1.784 | 1.000 | 1.000 | 0.000 | 0.000 |

Product Form

Variant Distance Matrix Adjusted for Relative Attribute Importance

Attribute1 (30%): Brand      Attribute 2 (70%): Flavor

| | Variant 1: Brand 1 | Variant 2: Brand 2 | Variant 3: Brand 3 | Variant 1: Flavor 1 | Variant 2: Flavor 2 | Variant 3: Flavor 3 | Variant 4: Flavor 4 |
|---|---|---|---|---|---|---|---|
| Variant 1: Brand 1 | 0 | 0.300 | 0.300 | | | | |
| Variant 2: Brand 2 | 0.300 | 0 | 0.235 | | *** | | |
| Variant 3: Brand 3 | 0.300 | 0.235 | 0 | | | | |
| Variant 1: Flavor 1 | | | | 0 | 0.684 | 0.700 | 0.700 |
| Variant 2: Flavor 2 | | | | 0.684 | 0 | 0.700 | 0.700 |
| Variant 3: Flavor 3 | | *** | | 0.700 | 0.700 | 0 | 0.610 |
| Variant 4: Flavor 4 | | | | 0.700 | 0.700 | 0.610 | 0 |

Attribute 1: Brand 30% Rel. Importance

Attribute 2: Flavor 70% Rel. Importance

Distance Between Genomes, Adjusted for Relative Attribute Importance and Variant Distance
(30% Brand, 70% Flavor)

Product Form

|   | A | B | C | D | E | F |
|---|---|---|---|---|---|---|
| A | 0 |   |   |   |   |   |
| B | 0.300 | 0 |   |   |   |   |
| C | 0.300 | 0.235 | 0 |   |   |   |
| D | 0.984 | 0.919 | 0.684 | 0 |   |   |
| E | 1.000 | 0.935 | 0.7 | 0.7 | 0 |   |
| F | 1.000 | 0.935 | 0.7 | 0.7 | 0 | 0 |

Product Form

FIG. 14

ND METHOD

RELATED CASES

This application claims the benefit of U.S. Provisional Application No. 61/586,434, filed on 13 Jan. 2012, by Karty et al., entitled Optimal Solution Identification in Interactive Evolutionary Algorithms, the content of which is all incorporated by reference.

BACKGROUND

When, as an example, attempting to create a new product or to improve an existing product, the opinions of those users (e.g., respondents) that the product may be directed towards may be gathered, e.g., in surveys or questionnaires. The questions may ask for, e.g., a rating of one or more product features (e.g., attributes), a preference when given a choice between one or more product features, or other information. The answers provided by the respondents may then be analyzed to identify the product form (e.g., those features (or combination of features)) that the majority of respondents preferred.

BRIEF SUMMARY OF DISCLOSURE

In one implementation, a method, performed by one or more computing devices, comprises receiving, at a computing device, data from at least one user, wherein at least a portion of the data is associated with the plurality of attribute variants. A variant relationship between one or more pairs of attribute variants of the plurality of attribute variants is determined based upon, at least in part, at least the portion of the data. The distance between the one or more pairs of objects is adjusted based upon, at least in part, the variant relationship between the one or more pairs of attribute variants of the plurality of attribute variants.

One or more of the following features may be included. The data may include one of choice data and rating data. The plurality of attribute variants may be based upon, at least in part, one or more categorical variables. The plurality of attribute variants may be based upon, at least in part, one or more continuous variables. Determining the variant relationship between the one or more pairs of attribute variants of the plurality of attribute variants may include determining a correlation between the one or more pairs of attribute variants across the at least one user and a second user. Adjusting the distance between the one or more pairs of attribute variants of the plurality of attribute variants may include reducing the distance between positively correlated attribute variants of the one or more pairs of attribute variants. The set of objects may be clustered based upon, at least in part, the adjusted distance.

In another implementation, a computing system includes a processor and a memory configured to perform operations comprising receiving data from at least one user, wherein at least a portion of the data is associated with the plurality of attribute variants. A variant relationship between one or more pairs of attribute variants of the plurality of attribute variants is determined based upon, at least in part, at least the portion of the data. The distance between the one or more pairs of objects is adjusted based upon, at least in part, the variant relationship between the one or more pairs of attribute variants of the plurality of attribute variants.

One or more of the following features may be included. The data may include one of choice data and rating data. The plurality of attribute variants may be based upon, at least in part, one or more categorical variables. The plurality of attribute variants may be based upon, at least in part, one or more continuous variables. Determining the variant relationship between the one or more pairs of attribute variants of the plurality of attribute variants may include determining a correlation between the one or more pairs of attribute variants across the at least one user and a second user. Adjusting the distance between the one or more pairs of attribute variants of the plurality of attribute variants may include reducing the distance between positively correlated attribute variants of the one or more pairs of attribute variants. The set of objects may be clustered based upon, at least in part, the adjusted distance.

In another implementation, a computer program product resides on a computer readable storage medium that has a plurality of instructions stored on it. When executed by a processor, the instructions cause the processor to perform operations comprising receiving data from at least one user, wherein at least a portion of the data is associated with the plurality of attribute variants. A variant relationship between one or more pairs of attribute variants of the plurality of attribute variants is determined based upon, at least in part, at least the portion of the data. The distance between the one or more pairs of objects is adjusted based upon, at least in part, the variant relationship between the one or more pairs of attribute variants of the plurality of attribute variants.

One or more of the following features may be included. The data may include one of choice data and rating data. The plurality of attribute variants may be based upon, at least in part, one or more categorical variables. The plurality of attribute variants may be based upon, at least in part, one or more continuous variables. Determining the variant relationship between the one or more pairs of attribute variants of the plurality of attribute variants may include determining a correlation between the one or more pairs of attribute variants across the at least one user and a second user. Adjusting the distance between the one or more pairs of attribute variants of the plurality of attribute variants may include reducing the distance between positively correlated attribute variants of the one or more pairs of attribute variants. The set of objects may be clustered based upon, at least in part, the adjusted distance.

The details of one or more implementations are set forth in the accompanying drawings and the description below. Other features and advantages will become apparent from the description, the drawings, and the claims.

BRIEF DESCRIPTION OF THE DRAWINGS

FIG. 5 is an illustrative schematic representation of a population of genomes, representing different forms of a product according to one or more implementations of the present disclosure;

FIG. 6 is an illustrative initial distance matrix for the IEA population of FIG. 5 according to one or more implementations of the present disclosure;

FIG. 7 is an illustrative adjusted distance matrix according to one or more implementations of the present disclosure;

FIG. 8 is an illustrative attribute variant correlation matrix according to one or more implementations of the present disclosure;

FIG. 10 is an illustrative variant similarity matrix according to one or more implementations of the present disclosure;

FIG. 11 is an illustrative variant distance matrix according to one or more implementations of the present disclosure;

FIG. 12 is an illustrative variant distance matrix according to one or more implementations of the present disclosure;

FIG. 13 is an illustrative weighted variant distance matrix according to one or more implementations of the present disclosure; and FIG. 14 is an illustrative genome distance matrix according to one or more implementations of the present disclosure.

Like reference symbols in the various drawings indicate like elements.

DETAILED DESCRIPTION

Figure 1:
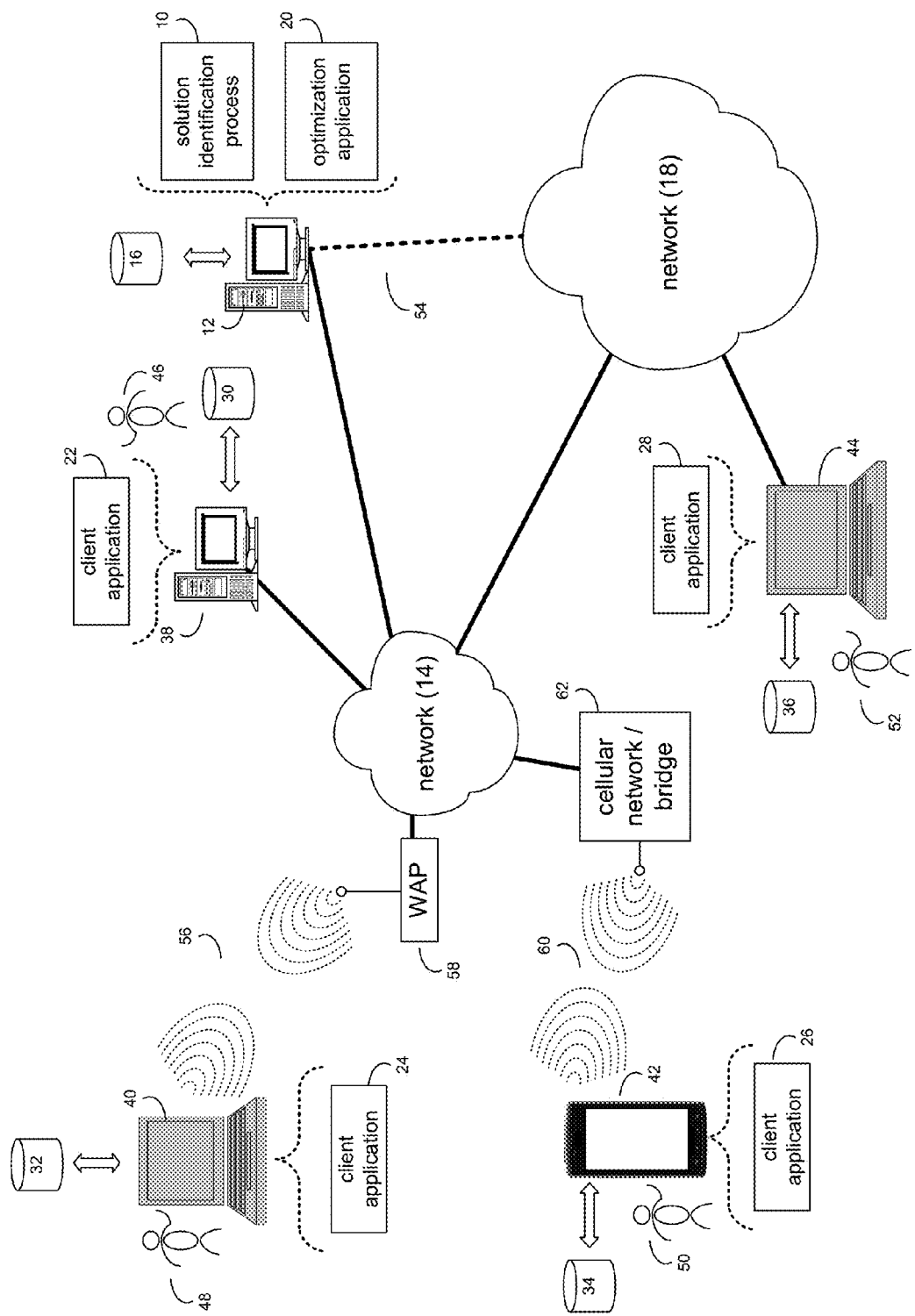
FIG. 1 is an illustrative diagrammatic view of a solution identification process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown solution identification process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, solution identification process 10 may receive data from at least one user, wherein at least a portion of the data is associated with the plurality of attribute variants. A variant relationship between one or more pairs of attribute variants of the plurality of attribute variants may be determined based upon, at least in part, at least the portion of the data. The distance between the one or more pairs of objects may be adjusted based upon, at least in part, the variant relationship between the one or more pairs of attribute variants of the plurality of attribute variants.

The instruction sets and subroutines of solution identification process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Solution identification process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an optimization application (e.g., optimization application 20), examples of which may include, but are not limited to, e.g., a questionnaire application, a survey application, an evolutionary algorithm application, an interactive evolutionary algorithm application, or other application that allows for the identification of optimal or near-optimal solutions to optimization problems (via some type of analysis). Solution identification process 10 and/or optimization application 20 may be accessed via client applications 22, 24, 26, 28. Solution identification process 10 may be a stand alone application, or may be an applet/application/script that may interact with and/or be executed within optimization application 20 and/or one or more of client applications 22, 24, 26, 28. Optimization application 20 may be a stand alone application, or may be an applet/application/script that may interact with and/or be executed within solution identification process 10 and/or one or more of client applications 22, 24, 26, 28. One or more of client applications 22, 24, 26, 28 may be a stand alone application, or may be an applet/application/script that may interact with and/or be executed within solution identification process 10 and/or optimization application 20. Examples of client applications 22, 24, 26, 28 may include, but are not limited to, e.g., a questionnaire application, a survey application, an evolutionary algorithm application, an interactive evolutionary algorithm application, or other application that allows for the identification of optimal or near-optimal solutions to optimization problems (using some type of analysis), a standard and/or mobile web browser, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of solution identification process 10 (and vice versa). Accordingly, solution identification process 10 may be a purely server-side application, a purely client-side application, or a hybrid server-side/client-side application that is cooperatively executed by one or more of client applications 22, 24, 26, 28 and/or solution identification process 10.

One or more of client applications 22, 24, 26, 28 may be configured to effectuate some or all of the functionality of optimization application 20 (and vice versa). Accordingly, optimization application 20 may be a purely server-side application, a purely client-side application, or a hybrid server-side/client-side application that is cooperatively executed by one or more of client applications 22, 24, 26, 28 and/or optimization application 20. As one or more of client applications 22, 24, 26, 28, solution identification process 10, and optimization application 20, taken singly or in any combination, may effectuate some or all of the same functionality, any description of effectuating such functionality via one or more of client applications 22, 24, 26, 28, solution identification process 10, optimization application 20, or combination thereof, and any described interaction(s) between one or more of client applications 22, 24, 26, 28, solution identification process 10, optimization application 20, or combination thereof to effectuate such functionality, should be taken as an example only and not to limit the scope of the disclosure.

Users 46, 48, 50, 52 may access computer 12 and solution identification process 10 directly through network 14 or through secondary network 18. Further, computer 12 may be connected to network 14 through secondary network 18, as illustrated with phantom link line 54. Solution identification process 10 may include one or more user interfaces, such as browsers and textual or graphical user interfaces, through which users 46, 48, 50, 52 may access solution identification process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
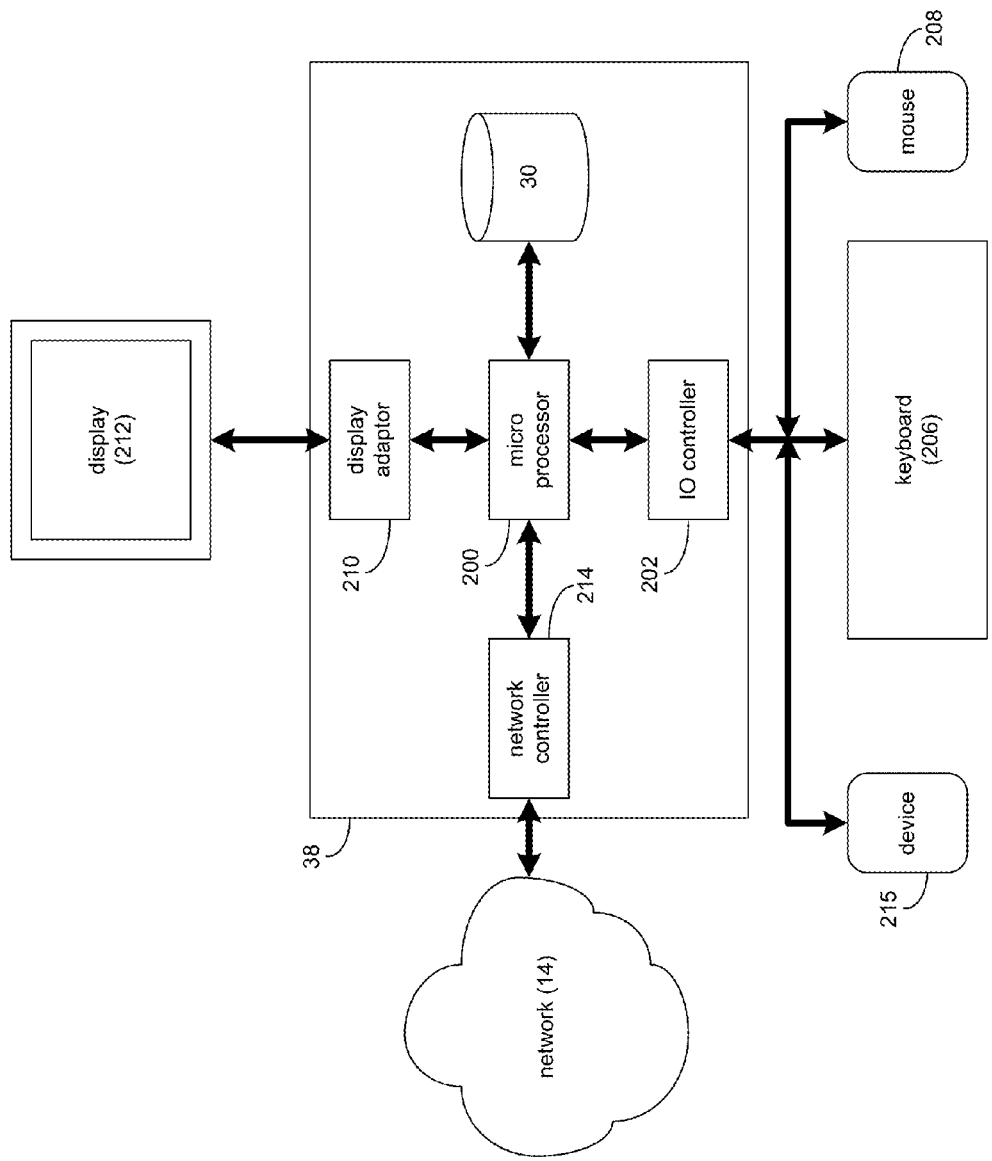
FIG. 2 is a diagrammatic view of a client electronic device of FIG. 1 according to one or more implementations of the present disclosure.
Figure 3:
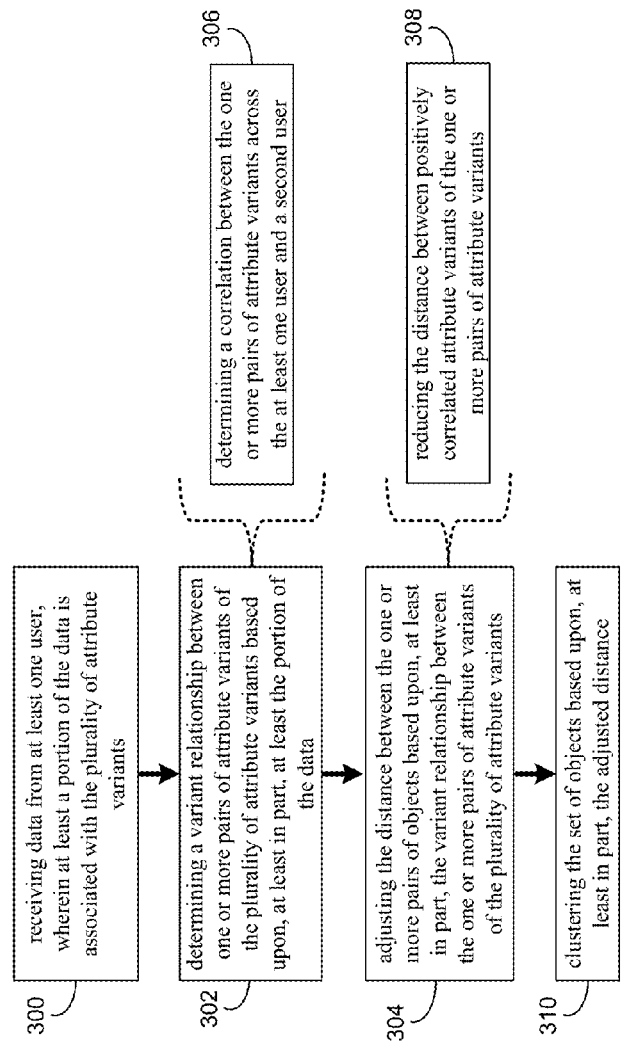
FIG. 3 is an illustrative flowchart of the solution identification process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, solution identification process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Evolutionary algorithms (EAs) may broadly be described as, e.g., stochastic search and optimization heuristics broadly inspired by evolution and survival of the fittest in nature. They may be used, for example, to find optimal or near-optimal solutions to difficult optimization problems, including, e.g., problems where the objective function may not be mathematically tractable (e.g., not differentiable) due to discontinuities and/or constraints. In particular, evolutionary algorithms may be used to solve, e.g., combinatorial optimization problems where the dimensions underlying the search space may include discrete and/or categorical values, and where exhaustive search may not be practical due to, e.g., the exponential blowup in the size of the search space (a.k.a., "the curse of dimensionality").

Evolutionary algorithms may be population based optimization heuristics, for example, in that they may operate on several candidate solutions at any given point during the process. This approach may help make them less vulnerable to local optima, and it may improve the search efficiency, e.g., due to the parallelization of the process. The key elements of an evolutionary algorithm may include, for example:

a) a representation or encoding scheme that may represent any alternative in the solution domain, and that may be amenable to the operations implemented by the evolutionary algorithm; the data structure that may implement this representation (e.g., the "genotype") may be a bit string in which different subsets of bits (different "genes") code for one or another of the dimensions underpinning the solution space; other encoding schemes may use integer, real-valued, or categorical genes;

b) a fitness function over the solution domain, that may allow the fitness of any alternative to be computed; this may be the objective function that is sought to be minimized or maximized;

c) a working population of solution alternatives (e.g., "genomes"), that may represent a small fraction of the solution space;

d) a set of operators that may act on the population, which may mimic the natural processes from which these algorithms may draw their inspiration: fitness-biased and/or locality-biased selection; breeding operations such as crossover or recombination; mutation operations; and death or removal operations.

In some evolutionary algorithms, an initial population of candidate solutions may be seeded randomly or quasi-randomly in order to represent the range of alternatives in the solution space. The fitness of these genomes may be evaluated using the fitness function. Those genomes that may be found to have greater fitness may be selected to become parents and to breed new candidate solutions. This selection process may be accomplished, e.g., using simulated tournaments or a virtual roulette wheel. In the latter case, genomes may be given wedges on the simulated roulette wheel sized in proportion to their fitness, and the roulette wheel may be "spun" as many times as necessary to select the needed number of mating pairs. The genomes of a selected pair of parents may be spliced in one or more locations and the different parts may be recombined during the crossover operation, thus creating one or more offspring. These new candidate solutions may embody different aspects of their two parents, potentially resulting in improved fitness. Furthermore, a mutation operator may intervene with some probability to change the value of one or another gene to a value not present in either parent. These two operators, in conjunction with the coding scheme, may implement different ways of exploring the solution space.

In the basic evolutionary algorithm, the population size may be kept constant. The offspring created by the breeding operations therefore may displace genomes from the previous generation of candidate solutions. In the example case of full generational replacement, the entire population may be discarded and may be replaced with an equal number of offspring. More often, an elitism mechanism may be used to preserve a small fraction of the fittest genomes from one generation to the next, which may result in generational overlap.

This process of fitness evaluation, fitness-biased selection, breeding (e.g., crossover and mutation), and generational replacement may be iterated a number of times (or generations), and may be stopped when a certain condition is achieved. For example, a stopping condition may include: no significant improvement in average population fitness over a certain number of generations; no improvement in the fitness of the best genome after a certain number of generations; the completion of a predetermined number of iteration cycles; reduction of population diversity below a certain threshold; a genome achieving a predetermined fitness level; the passage of a certain period of time; etc.

Identifying Optimal Solutions Using the Basic Evolutionary Algorithm:

The procedure for identifying optimal or near-optimal solutions may be somewhat straightforward, since an objective fitness evaluation may be available for every genome in the EA population up to that point, as well as every genome ever created during the optimization process. It is thus a matter of selecting the genome or genomes with the best fitness score. However, nothing in the present disclosure should preclude using the solution identification process in the case of a traditional, non interactive EA, e.g., where exogenous perceptual variant distance is obtained from users.

Interactive Evolutionary/Genetic Algorithms

Interactive evolutionary algorithms (IEAs) may differ from the basic evolutionary algorithm, e.g., in the nature of the fitness assessment. An IEA may not have the benefit of an objective fitness function able to provide a fitness score for any genome in the solution space; rather, one or more persons interacting with the algorithm may provide a (typically subjective) fitness assessment. This interaction may consist of the human assessor(s) considering phenomes, e.g., representations or actual embodiments of the solutions represented by corresponding genomes in the EA population, and providing the EA with a rating of their fitness using some scale. This approach may be used in cases where, e.g., assessing the fitness of a solution may require expert judgment and experiential knowledge that may be impractical or impossible to capture and codify in a fitness function, or where different experts may add a subjective component to the fitness assessment. The approach may also be useful in cases where fitness is not completely known or cannot be articulated a priori but emerges through the search process, as the human assessors discover and learn about the solution space and are able to compare and assess new possibilities with which they may not have been previously familiar.

One example challenge in designing an interactive evolutionary algorithm may include designing the assessor's interaction and fitness assessment task. Setting aside certain highly technical applications, it may not be dissimilar to deciding on a scaling technique to use in a questionnaire or survey instrument. Different scales may be available depending on whether or not the task is comparative in nature. In the former example, two or more phenomes may be presented to the assessor at a time, and scaling options may include pairwise comparison and full or partial rank ordering. In the example of a non-comparative task, where one phenome may be presented at time, scaling options may include continuous rating and Likert scales, among others.

Identifying Solutions Using an Interactive Evolutionary Algorithm

Identifying optimal solutions using an interactive evolutionary algorithm may be more complex than with a regular evolutionary algorithm. For example, since there may not be an objective function to provide a clear measure of fitness, one cannot simply look through the concepts generated and evaluated by the evolutionary algorithm up to that point and choose the one with the highest objective fitness value.

An example approach maybe to impute fitness values for the various genomes based on, e.g., the ratings given or choices made by the selector(s), and to use these fitness proxies to identify the best solutions. This may pose challenges, including sampling bias, scale use bias, and aggregating fitness assessments across multiple assessors.

An example commercial application of multi-participant interactive evolutionary algorithms is the optimization of new products, services, and marketing concepts. In such innovation and marketing applications, one may be interested in finding more than one optimal or near-optimal solution, e.g., to reflect potentially heterogeneous preferences within the sample of respondents (the group of assessors representing consumers). In the example, the goal may be to identify several highly fit genomes that are sufficiently dissimilar to one another. This may introduce further challenges, one of which may be determining what constitutes sufficient dissimilarity.

An example of the various approaches to finding a set of differentiated solutions may include, e.g., cluster analysis. Cluster analysis (as well as other example types of analysis) may be applied to the evolved EA population or any other group of highly fit genomes. This approach may take advantage of the fact that, as the evolutionary optimization progresses, evolved genomes may tend to "congregate" at or near the optima within the solution space/fitness landscape. Clustering algorithms may require as a key input a distance measure, which may be used to gauge the similarity between any two members of the population being partitioned. This may introduce another example challenge, e.g., the potential divergence between objective distance measures and dissimilarity as perceived by human assessors.

In the example of a population of genomes, a readily available distance metric may include a genetic distance. Genetic distance may be broadly determined a priori by the attributes and objective dimensions that may underlie the solution space, as well as the coding scheme that may be used to represent them as genes. Perceived dissimilarity, on the other hand, may be based on the subjectively perceived phenotypic distance between different points along these dimensions. One example of such divergence may include the objective reflectance measurement of a printed photograph compared to the human perception of gloss.

In marketing, innovation, advertising and similar application examples, the attributes of interest may not be quantitative but categorical in nature, which may tend to exacerbate this divergence. For example, a concept for a new sports drink may include a Flavor attribute and a Product Benefit attribute, with the following example sets of variants, respectively: {"Lemon-Lime", "Lemonade", "Lime", "Fruit Punch", "Berry", "Melon"} and {"Quenches your thirst", "Replenishes key electrolytes", "Gives you an energy boost", "Boosts fluids absorption"}. With an example genotype consisting of a string of categorical variables, one may be reduced to using the Hamming distance, which may be described as the count of the (minimum) number of substitutions required to change one member of the population into another. This means that the genetic distance between two concepts that differ only in flavor is the same regardless of whether the two flavors being compared are Lime and Lemon-Lime, or Lime and Melon.

The poor correspondence between this coarse distance metric and perceived dissimilarity may result in significant distortion of the optimization outcome. An example distortion may result from "vote splitting", in the case of a choice or constant sum based assessment. In such an example, an assessor may divide his choices or ratings among two or more alternatives the assessor deems similar or substitutable, thus allowing a less preferred alternative to emerge as the optimal solution.

For example, using the flavor attribute of the above example, it may be possible to determine the relative frequency of the six flavors at the beginning of the optimization process and their frequency at the end of the optimization process. It may be observed that all six flavors survived (reflecting the variety of preferences among the group of respondents or assessors), and that "Fruit Punch" was the most preferred. However, the first three flavors may have been viewed as fairly similar by most assessors (e.g., users); at least, more similar to each other than to the other flavors in the set. If these three flavors were combined into a single flavor, referred to generically as "Citrus", they would collectively dominate all other flavors.

Ironically, a marketer may be more likely to include multiple similar or related variants for an attribute (e.g., multiple versions of citrus-related flavors) when they believe that there may be strong consumer interest in that type of variant, thus exacerbating the vote-splitting problem and making it less likely that one of these variants will emerge on top.

To help, at least in part, address vote-splitting and/or other distortions in identifying optimal solutions in an IEA (or other algorithm), the distance measure used to assess the degree of differentiation between solutions may be improved to reflect human perception of similarity. For example, it may be possible to obtain, exogenously to the evolutionary process, information about attribute variant similarity. This information may be provided indirectly, e.g., by the people responsible for specifying the solution domain. In the example of marketing or product innovation applications (or otherwise), those may be, e.g., the marketers or product developers. However, different stakeholders from different fields of expertise are likely to disagree on a similarity measure. In the above example, flavor scientists may base their similarity ratings on the chemical composition of flavorants, while marketers may rely on their interpretation of consumer perceptions, neither of which may be accurate.

Since the perception of the assessors may be more relevant to the outcome of the optimization than the technical assessment of scientists or marketers (or the like), an example approach may be to ask the assessors directly. This may be done in a separate survey or set of tasks, either before or after their participation in the interactive optimization process, etc. That information may also be obtained from a different cohort of representative consumers that may not be involved in the optimization process itself. This general approach may suffer from several example drawbacks as well, related, e.g., to the length of a respondent's session and the difficulty and expense of finding and compensating respondents.

Another example approach for identifying optimal and near-optimal solutions in interactive evolutionary algorithms may take into account attribute variant similarity. In some implementations, the alternative approach need not impose additional tasks and cognitive load on human assessors and need not require assessors or experts to provide additional exogenous information about the solution domain.

As discussed above and referring also to FIGS. 3-14, solution identification process 10 may receive 300 data from at least one user, wherein at least a portion of the data is associated with a plurality of attribute variants. A variant relationship between one or more pairs of attribute variants of the plurality of attribute variants may be determined 302 by solution identification process 10 based upon, at least in part, at least the portion of the data. The distance between the one or more pairs of objects may be adjusted 304 by solution identification process 10 based upon, at least in part, the variant relationship between the one or more pairs of attribute variants of the plurality of attribute variants.

Figure 4:
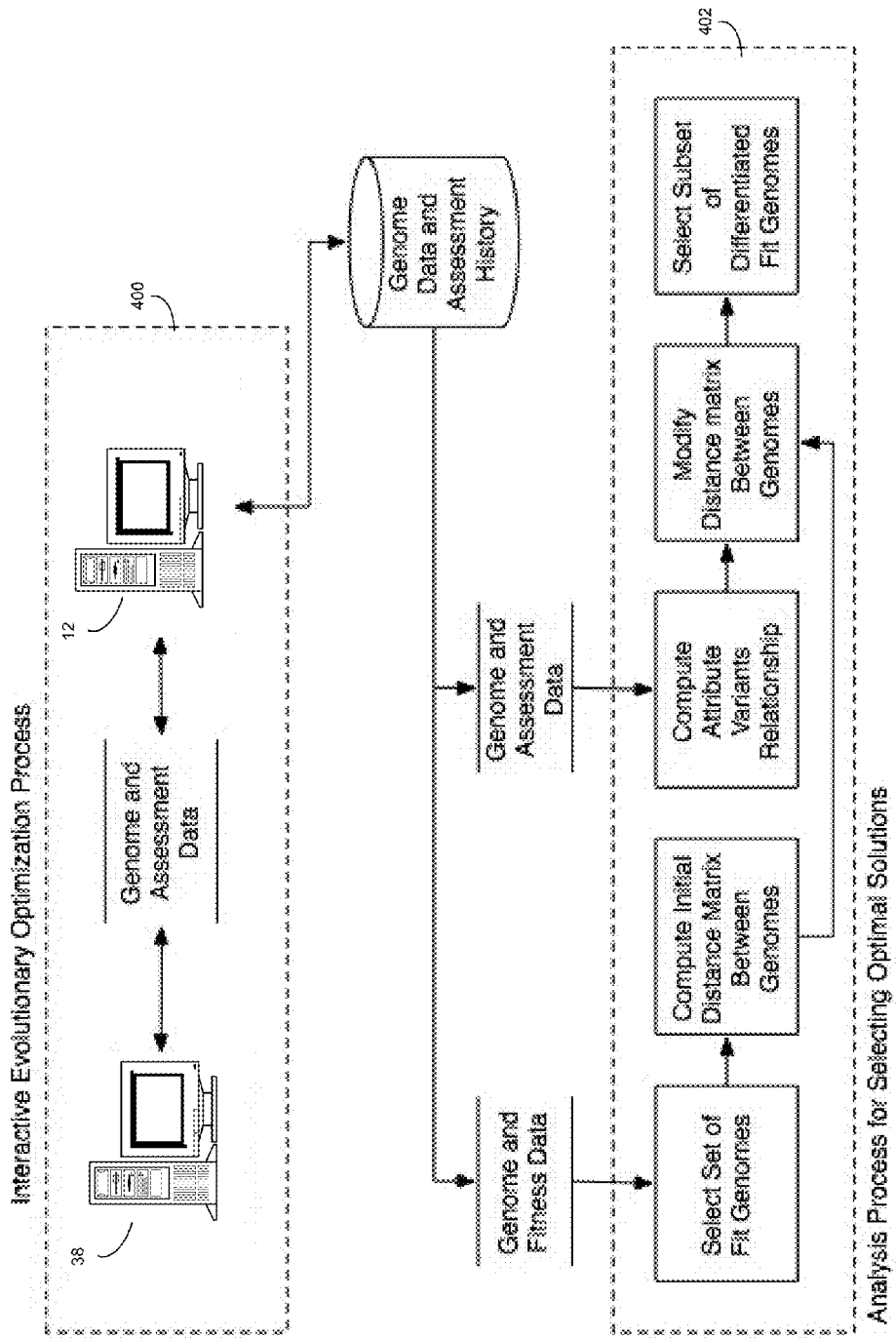
FIG. 4 is an illustrative alternative flowchart view of the solution identification process of FIG. 1 according to one or more implementations of the present disclosure.
Figure 9:
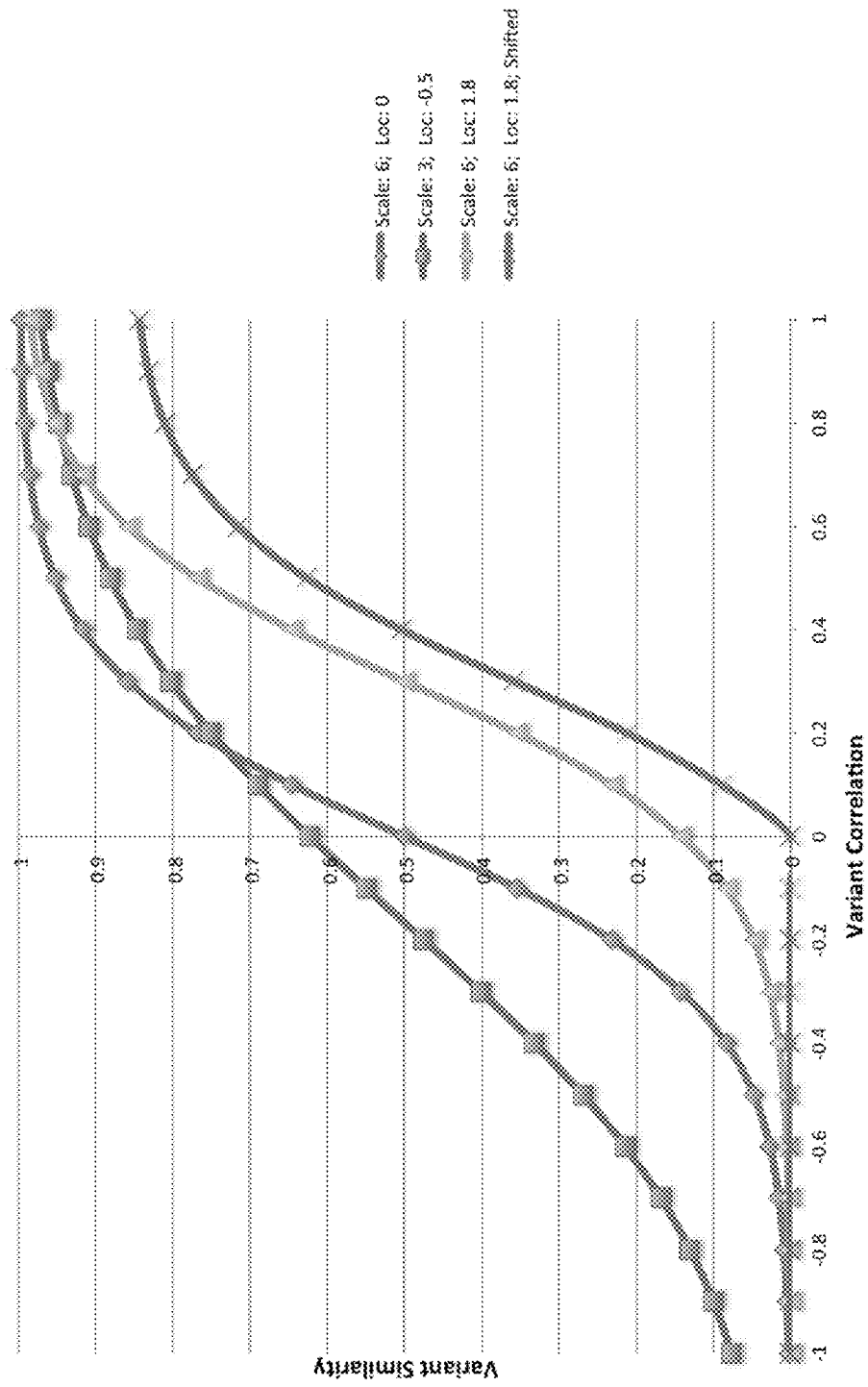
FIG. 9 is an illustrative set of transformation functions that may be used to modify an attribute variant correlation according to one or more implementations of the present disclosure

In some implementations, and referring at least to portion 400 of FIG. 4, solution identification process 10 may receive 300 data (e.g., genome data, fitness data, and/or assessment data) from at least one user (e.g., user 46), wherein at least a portion of the data may be associated with a plurality of attribute variants. For example, solution identification process 10 may (e.g., via a user interface) present to users at any of the above-noted client electronic devices, product forms to obtain fitness assessments for the corresponding genomes. In some implementations, solution identification process 10 may configure the IEA such that one user interacts with the IEA and drives the optimization, either during one session or over a number of interaction sessions extending over some period of time. In some implementations, multiple users may interact with the IEA to provide fitness assessments. At any time during their interaction, users may be providing fitness feedback on one form of the product or on different forms of the product generated by the IEA during the evolution process. These assessments may be used individually or combined in different ways by solution identification process 10, to provide the selection pressure that drives the evolutionary optimization process. The users may, in some examples, all interact with IEA at the same time, or asynchronously.

In some implementations, an assessor (e.g., user 46) may, in some implementations, interact with the IEA, e.g., via a client electronic device 38, solution identification process 10, optimization application 20, client application 22, or combination thereof to receive 300 the data. For example, in some implementations, client application 22 may obtain genome information (e.g., from solution identification process 10 and/or optimization application 20) for the genome(s) to be assessed by user 46. Client application 22 may render the phenotypic representation corresponding to the particular genome(s) and displays the product form(s) via display 212. User 46 may submit assessment information via, e.g., keyboard 206, a pointing device 208, or any other appropriate input device 215. Client application 22 may transmit the assessment information back to solution identification process 10 and/or optimization application 20 for analysis and/or may be analyzed at client electronic device 38.

In some implementations, solution identification process 10 may perform interactive evolutionary algorithm (IEA), e.g., to identify optimal or near-optimal forms of such things as a product or service. For example, the product may include, e.g., a consumer good (e.g., a soft drink, frozen dinner, laundry detergent or other cleaning product, beauty cream, soap, shaving cream, etc.) and/or its packaging. The product may also include, e.g., a durable good, such as a white good or small appliance, furniture, a personal computer or smart phone, an automobile or bicycle, etc. The product may also include, e.g., an item of clothing or other personal items, such as a watch or eyeglasses. Other examples of products, such as toys and games, may also be used without departing from the scope of this disclosure. A service may include, e.g., a gym membership, cable TV subscription, phone service, cleaning service, etc. The product or service to be optimized may also represent an advertisement (e.g., print or online), a website, the cover of a book, among other non-limiting examples.

The product or service may include one or more attributes, such as but not limited to brand, flavor, color, form, texture, scent, etc. Other examples of attributes may include, e.g., textual elements representing a positioning statement, a feature, a product benefit, a description of a consumer insight or consumer need that the product is intended to address. Further example attributes may include, e.g., size, weight, number of servings per package. Attributes may include the location and size of design elements such as the size and position of a brand logo on a product or its packaging, or the size and location of an image or text block in the case, e.g., of an advertisement or a webpage. Other examples of attributes may also be used without departing from the scope of the disclosure.

As noted above, at least a portion of the data may be associated with a plurality of attribute variants (e.g., each attribute in turn may include different variants). In some implementations, the plurality of attribute variants may be based upon, at least in part, one or more categorical variables. For instance, as in the example case of different brand names or different flavors. In some implementations, the plurality of attribute variants may be based upon, at least in part, one or more continuous variables. For instance, on a ratio scale in the example case of weight, size, location coordinates, or on an interval scale in the example case of an indication of cleaning power of a detergent.

In some implementations, the attributes and their associated variants may be represented by the appropriate variable types. Continuous attributes may be discretized to arbitrary precision, as dictated by the needs of the optimization problem. The different attributes may be further combined into a data structure capable of representing any combination of attribute variants that may be combined to represent a form of the product or service. The example data structure may represent the genotype of the evolutionary algorithm, and any particular instantiation may represent a genome that codes for a particular product form.

In some implementations, solution identification process 10 may instantiate a population of genomes and store them, e.g., at computer 12. This initial population may be seeded randomly or quasi randomly by solution identification process 10, e.g., to reflect the range of attribute variants underlying the search space as evenly as practical. In some implementations, solution identification process 10 may perform various IEA operations, such as but not limited to obtaining fitness assessment for at least some of the genomes in the population of genomes, performing fitness-biased selection for mating purposes, executing the mating operations, such as crossover and mutation, and replacing less fit and/or older members of the genome population with the newly created offspring. These operations may be iterated as often as desired or necessary to arrive at highly fit genomes. In some implementations, solution identification process 10 may stop the iterations when a certain condition is achieved (e.g., a desired solution is obtained), or may continue on an ongoing basis.

In some implementations, the data may include one of choice data and rating data. For example, the interaction of user 46 with the IEA through client application 22 may be structured, for example, so user 46 may provide a fitness assessment for a single genome at a time (e.g., a monadic assessment), or a comparative assessment involving more than one genome presented together. In the former example, the assessment may take one of several forms, e.g., entry or selection on a rating on a numerical or semantic differential scale, representing a range of fitness. For example, a numerical scale may range from, e.g., 0 to 100, with 0 representing the lowest level of fitness and 100 the highest. Additionally/alternatively, a scale from, e.g., 0 to 7 may be used for the same purpose. A semantic differential scale may represent values from, e.g., "Highly unfit" to "Highly fit", or "Low fitness" to "High fitness". Whichever rating scale is used, solution identification process 10 may present it to user 46 along with the phenotypic representation of the genome encoding the particular product form to be assessed, e.g., via display 212. In some implementations, user 46 may provide the rating on that scale using any of the above-noted input devices, for example, by "clicking" at a location on the scale rendering, dragging a slider on the scale, entering a value in a text box, or combination thereof.

In the example case of a comparative assessment, more than one product form corresponding to more than one genome, may be presented together on display 212. This set may include at least 2 product forms. The product forms may be rendered on display 212 (e.g., via client application 22) in full size, or as small thumbnails that may be magnified to full size (or greater) through an action of user 46, such as hovering the pointer of an attached pointing device over the thumbnail to be magnified. In some implementations, user 46 may consider the product forms on display 212, and may make a single choice (e.g., selecting the most fit product form of the set), provide a rank ordering for all product forms in the set, or a partial ordering for a subset thereof. The fitness assessment may consist of placing different members of the set along a rating scale or a differential scale. Many variations on the interaction of user 46 with the set of forms are possible without departing from the scope of the disclosure. In some implementations, solution identification process 10 (e.g., via client application 22) may enable user 46 to compare the product forms in the set, e.g., two at a time, in a sequence of paired comparisons, to simplify the assessment task and the attending cognitive load. It will be appreciated that any type of preference data, including but not limited to the above-noted choice data and rating data, may be used without departing from the scope of the disclosure.

Depending on the specific objective of the optimization, the instructions provided to user 46 to complete the assessment, and/or the labels used on the rating scale, may be modified accordingly. Some example optimization objectives may include, maximizing purchase likelihood by user 46 as a representative consumer, identifying the product form that user 46 finds most appealing, most novel, or easiest to use, or healthiest to consume, and so on.

As noted above, data about the genomes presented to user 46, and the fitness assessment provided by user 46 (and/or other users) may be received by solution identification process 10, optimization application 20, or combination thereof at any point in time during the IEA process. In some implementations, prior to making use of the data, solution identification process 10 may apply various transformations, scaling, and aggregation schemes. Solution identification process 10 may use the data to conduct additional analysis as discussed below.

At different points in time, e.g., during the operation of the IEA or after completion, groups of genomes generated during the IEA optimization process may be analyzed to identify high fitness genomes.

In some implementations, and referring at least to portion 402 of FIG. 4, solution identification process 10 may identify a set of genomes on which to perform the analysis. The population may include but is not limited to the current IEA population, genomes selected from different snapshots in time of the IEA population, and/or genomes filtered by solution identification process 10 so as only to include genomes that meet certain criteria such as a fitness threshold for example.

Referring at least to FIG. 5, an example of a population of genomes to be analyzed is shown. In this non-limiting example, the population consists of 6 different genomes that may represent 6 different product forms, where a product form may be broadly defined in this example by brand attribute 500 and flavor attribute 502. While the example population of genomes shown is only six, it will be appreciated that the population of genomes being analyzed by solution identification process 10 may range in size, e.g., from twenty genomes to several hundred genomes.

As noted above, brand attributes 500 and flavor attributes 502 may be represented by categorical variables. For example, brand attribute 500 may include three example variants, respectively labeled "Brand 1" to "Brand 3". Flavor attribute 502 may include 4 example variants, respectively labeled "Flavor 1" to "Flavor 4". In this particular population of genomes, the latter flavor, Flavor 4, is not represented.

In some implementations (and referring again to portion 402 of FIG. 4), given the set of genomes to be analyzed by solution identification process 10, an initial distance matrix between these genomes may be determined by solution identification process 10. For example, FIG. 6 shows an example initial distance matrix 600 for the population of genomes of FIG. 5. In this example, the distance between two genomes is not directional, and as such, the distance matrix may be symmetric and only the lower triangular half is shown. In some implementations, the initial distance used may include the Hamming distance, as the two variables or genes that make up the genotype are categorical. The distance between any two genomes may therefore include the number of attribute variant differences or different alleles between them. However, use of the Hamming distance should not be taken as a limitation of the present disclosure. In some implementations, such as the example cases where the attributes may be coded using continuous variables (e.g., integer genes or real-valued genes), the appropriate distance metrics may be used by solution identification process 10 to determine the initial distance matrix.

In some implementations, a variant relationship between one or more pairs of attribute variants of the plurality of attribute variants may be determined 302 by solution identification process 10 based upon, at least in part, at least the portion of the data. For example, and referring again at least to portion 402 of FIG. 4, the genome and assessment data may be analyzed by solution identification process 10 to estimate relationships between the attribute variants underpinning the search space. The genome and assessment data may include, for example, data specifying the makeup of the genomes (e.g., the values of the variants present in the genome(s) in question) and/or may include the above-noted assessment data received by the genome(s) in question, and/or the identifier of the user that provided the assessment. In some implementations, the genome and assessment data may include at least a portion of the assessment history collected from, e.g., the start of the IEA up to a particular point in time when the above-noted analysis is triggered. Additionally/alternatively, a subset of that data may be used, selected on the basis of, e.g., convenience, recent receipt of the data, relevance, or otherwise.

Still referring at least to portion 402 of FIG. 4, the analysis and determination 302 (e.g., computation of attribute variant relationship) of the genome and assessment data by solution identification process 10 may include one or more of various analytical techniques. The analysis techniques that may be used may, for example, depend on the nature of the assessment data collected, and on the assessment interaction enabled by solution identification process 10. For example, in some implementations, the analysis may include determining a "batting average" of the different attribute variants. In the example case of a comparative assessment, the batting average of an attribute variant may be determined, e.g., as the ratio of the number of times a product form that includes the variant was chosen by the assessor (e.g., user), over the number of times such a product form was presented to the user. In the example case of a rating-based assessment, the batting average may be determined, e.g., as the average rating received by product forms that include the variant of interest. Although variant batting averages may be determined at the aggregate level across the entire group of assessors, the batting averages may be estimated, e.g., for individual users, or for subgroups of users.

In some implementations, the analysis and determination 302 (e.g., computation of attribute variant relationship) of the genome and assessment data by solution identification process 10 may include statistical modeling, e.g., to estimate the utility of the different attribute variants (e.g., the contribution of the different attribute variants to the ratings, rankings, or choices made by the users). The model used may depend on, e.g., the nature of the assessment task. For instance, in the example case of a rating assessment task, a simple OLS regression model may be used to determine 302 (e.g., estimate) the contribution or utility of each variant. In the example case of a comparative assessment, appropriate models may include, e.g., the logit and probit models. In the example case where an ordering or partial ordering assessment task is used, ordered logit, multinomial logit or a Plackett-Luce model, for example, may be used. In some implementations, the utilities may be determined 302 (e.g., estimated) at the individual participant level using, for example, a Hierarchical Bayesian estimation technique. In some implementations, the utilities may be determined at the user subgroup level, using for example a mixture modeling technique, such as latent class.

In some implementations, the distance between the one or more pairs of objects may be adjusted 304 by solution identification process 10 based upon, at least in part, the variant relationship between the one or more pairs of attribute variants of the plurality of attribute variants. For example, the above-noted batting averages or utilities of the attribute variants, determined 302 as described above, may be used by solution identification process 10 to adjust 304 (e.g., modify)

the initial genome distance matrix of FIG. 6. For instance, solution identification process 10 may determine (e.g., estimate) the relative importance of the different attributes, by, e.g., determining the within-attribute dispersion of batting averages or utilities, and comparing them across attributes. In the example, if the difference in utility across the range of brands is smaller than the difference in utility across the range of flavors, then the implication is that brand has less of an impact on the assessment of a product form, and is therefore a less important attribute. Within-attribute measures of dispersions that may be used may include, e.g., the range of batting averages or utilities, standard deviation and/or mean absolute deviation, etc. The adjusted distance matrix 700 in example FIG. 7 shows the example distance matrix 600 of FIG. 6, after being adjusted 304 to reflect example estimated relative attribute importance of 30% for the brand attribute, and 70% for the flavor attribute.

In some implementations, determining 302 the variant relationship between the one or more pairs of attribute variants of the plurality of attribute variants may include solution identification process 10 determining 306 a correlation between the one or more pairs of attribute variants across the at least one user and a second user. For example, the relationship between attribute variants may be determined 302 by determining 306 the correlation between the variant batting averages or utilities across individual users, or across subgroups of users. An example utility correlation matrix 800 for the attribute variants of the above example is shown at FIG. 8. In the non-limiting example, only within variant correlations were computed, and the resulting correlation matrix 800 is block diagonal. For example, correlation matrix 800 may indicate that Brand 2 and Brand 3 are positively correlated, and indicate that many users that found Brand 2 to have contributed to the fitness of a genome comprising it tended also to find that Brand 3 did as well for a genome comprising it, and vice versa. The example correlation structure between variants of a given attribute may be used by solution identification process 10 to impute, e.g., an estimate of similarity or substitutability between variants.

In some implementations, solution identification process 10 may apply one or more transformations 900 (such as those shown by example in FIG. 9) to the above-noted correlation data, e.g., to convert them into proxies for variant similarity. In the first three examples, the transformation functions may be parameterized using a scale parameter ("Scale") and a location parameter ("Loc"). The example formula used is:

$$\text{Var\_Sim} = \frac{1}{1 + e^{-(Var\_Corr*Scale+Loc)}}$$

where e is the base of the natural logarithms.

The fourth example function may also be shifted down by the value of its vertical intercept, e.g., to make it pass through the origin at (0,0). The corresponding example formula is:

$$\text{Var\_Sim} = \frac{1}{1 + e^{-(Var\_Corr*Scale+Loc)}} - \frac{1}{1 + e^{Loc}}$$

Additionally, in the example, all resulting negative values for variant similarity may be set to zero.

An example variant similarity matrix 1000 in FIG. 10 is shown that corresponds to the example variant correlation matrix 800, using the example transformation described above, with the non-limiting example parameters Scale=6 and Loc=1.8.

In some implementations, the above-noted transformations or similar ones may achieve certain effects when imputing variant similarity from variant correlation. For example, capping the maximum value of similarity, even if correlation is high, may maintain an amount of differentiation between highly correlated variants. In some implementations, setting the similarity of negatively correlated variants to zero may be done if the confidence in the negative correlation estimates is low. It will be appreciated that other transformation functions may also be used without departing from the scope of the disclosure (e.g., to refine the desired effects described above, or to achieve different effects).

Before using the above-noted variant similarity matrix to modify the above-noted genome distance matrix, the former may be converted by solution identification process 10 into a variant distance matrix by subtracting it from a block diagonal unit matrix of the appropriate dimensions. The resulting variant distance matrix 1100 corresponding to the above example is shown in FIG. 11.

In some implementations, variant distance matrix 1100 may be used by solution identification process 10 to determine a modified genotype distance matrix (e.g., modify the distance matrix between genomes shown in portion 402 of FIG. 4), which may result in distance matrix 1200 shown in example FIG. 12 (as compared to the initial genome distance matrix 600 in FIG. 6). In some implementations therefore, adjusting 304 the distance between the one or more pairs of attribute variants of the plurality of attribute variants may include solution identification process 10 reducing 308 the distance between positively correlated attribute variants of the one or more pairs of attribute variants.

In some implementations, relative attribute importance and variant similarity may be combined to modify the genome distance matrix. For example, solution identification process 10 may use the relative attribute importance to appropriately weight the elements of the variant distance matrix. For example, FIG. 13 shows weighted variant distance matrix 1300, for the above example, in the example case where the relative importance of the Brand attribute is, e.g., 0.3 and the relative importance of the Flavor attribute is, e.g., 0.7. More generally, the following example element-wise formula may be applied by solution identification process 10 to perform the weighting:

$$\text{weightedVariantDist}_{i,j}{}^g = (\text{relAttributeWeight}(g) * \text{variantDist}_{i,j})^Q$$

where g is the attribute in question, i and j the variants of g between which the distance is being determined, and Q is a power that was set to 1 in the example of FIG. 13.

In some implementations, solution identification process 10 may use weighted variant distance matrix 1300, which may result in the genome distance matrix 1400 shown in example FIG. 14 (in the example case noted above).

In some implementations, the above-noted modified genome distance matrix may be used by solution identification process 10, e.g., to identify and select a small subset of the genome population (e.g., select a subset of differentiated fit genomes in portion 402 of FIG. 4), typically a few, as optimal or near-optimal concepts, having an arbitrary degree of differentiation from one another. This may be done in a number of ways, including but not limited to inspection, e.g., in the case of a very small set, such as between 10 and 20 genomes. In some implementations, the set of objects (e.g., genomes) may be clustered 310 by solution identification process 10 based upon, at least in part, the adjusted distance. For instance, solution identification process 10 may include a clustering algorithm to partition a larger set of genomes (e.g., between 40 and several hundred), to identify those areas of the solution domain in which genomes tend to congregate during the IEA optimization process of solution identification process 10, and to identify representative genomes for these high density areas. Any number of clustering algorithms may be used, such as but not limited to Partitioning Around Medoids (PAM) or K-medoids more generally, K-means, as well as hierarchical clustering.

While the disclosure may be described using, e.g., evolutionary computing (e.g., interactive evolutionary computing,), it will be appreciated that the disclosure may be used in any situation where a population of items may be clustered, and where, e.g., exogeneous similarity information may be available for use in refining a distance metric used in the clustering process. As such, the disclosure involving evolutionary computing should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method for performing analysis on a set of objects having a plurality of attributes and a related distance metric between pairs of objects, the method comprising:
   calculating, at a computing device, utility data associated with attributes of a first type and a second type;
   determining, at the computing device, a relationship between the first type and the second type of attributes by calculating a first difference metric between the utility values for the first type of attribute, and calculating a second difference metric between the utility values for the second type of attribute; and
   determining, at the computing device, a relative attribute importance based on which of the first type of attribute or the second type of attribute affects the pairs of objects to a greater degree, wherein the relative attribute importance is based on a first within-attribute dispersion of a variant batting average of the first type of attribute and a second within-attribute dispersion of a variant batting average of the second type of attribute;
   determining, at the computing device, a correlation between the first type of attribute and the second type of attribute;
   determining, at the computing device, a variant similarity by transforming the correlation between the first type of attribute and the second type of attribute, wherein the correlation between the first type of attribute and the second type of attribute is transformed into the variant similarity by taking one over one plus e to the negative power of the correlation times a scale parameter plus a location parameter; and
   improving a search efficiency computation by adjusting, at the computing device, the related distance metric between the pairs of objects in the set based upon the relative attribute importance and the variant similarity.

2. The computer-implemented method of claim 1 wherein the utility data includes at least one of choice data or rating data.

3. The computer-implemented method of claim 1 wherein the plurality of attributes is based upon one or more categorical variables.

4. The computer-implemented method of claim 1 wherein the plurality of attributes is based upon one or more continuous variables.

5. The computer-implemented method of claim 1 wherein the correlation between the first type and the second type of attributes is determined across a first user and a second user.

6. The computer-implemented method of claim 1 wherein the adjusting of the related distance metric between the one or more pairs of objects includes reducing a distance metric between positively correlated first type or second type of attributes.

7. The computer-implemented method of claim 1 further including clustering the set of objects based upon the adjusted related distance metric between the pairs of objects in the set of objects.

8. A computing system for performing analysis on a set of objects having a plurality of attributes and a related distance metric between pairs of objects, the computing system including a processor and a memory configured to:
   calculate utility data associated with attributes of a first type and a second type;
   determine a relationship between the first type and the second type of attributes by calculating a first difference metric between the utility values for the first type of attribute and calculating a second difference metric between the utility values for the second type of attribute; and
   determine a relative attribute importance based on which of the first type of attribute or the second type of attribute affects the pairs of objects to a greater degree, wherein the relative attribute importance is based on a first within-attribute dispersion of a variant batting average of the first type of attribute and a second within-attribute dispersion of a variant batting average of the second type of attribute;

determine a correlation between the first type of attribute and the second type of attribute;

determine a variant similarity by transforming the correlation between the first type of attribute or the second type of attribute, wherein the correlation between the first type of attribute and the second type of attribute is transformed into the variant similarity by taking one over one plus e to the negative power of the correlation times a scale parameter plus a location parameter; and improve a search efficiency computation by adjusting the related distance metric between the pairs of objects in the set based upon the relative attribute importance and the variant similarity.

9. The computing system of claim 8 wherein the utility data includes at least one of choice data or rating data.

10. The computing system of claim 8 wherein the plurality of attributes is based upon one or more categorical variables.

11. The computing system of claim 8 wherein the plurality of attributes is based upon one or more continuous variables.

12. The computing system of claim 8 wherein the correlation between the first type and the second type of attributes is determined across a first user and a second user.

13. The computing system of claim 8 wherein the adjusting of the related distance metric between the one or more pairs of objects includes reducing a distance metric between positively correlated attributes of the first type or the second type.

14. The computing system of claim 8 further including clustering the set of objects based upon the adjusted related distance metric between the pairs of objects in the set of objects.

15. A computer readable storage medium comprising instructions which, when executed by a processor, cause the processor to, at least:

calculate utility data associated with attributes of a first type and a second type;

determine a relationship between the first type and the second type of attributes by calculating a first difference metric between the utility values for the first type of attribute, and calculating a second difference metric between the utility values for the second type of attribute; and determine a relative attribute importance based on which of the first type of attribute or the second type of attribute affects pairs of objects to a greater degree, wherein the relative attribute importance is based on a first within-attribute dispersion of a variant batting average of the first type of attribute and a second within-attribute dispersion of a variant batting average of the second type of attribute;

determine a correlation between the first type of attribute and the second type of attribute;

determine a variant similarity by transforming the correlation between the first type of attribute or the second type of attribute, wherein the correlation between the first type of attribute and the second type of attribute is transformed into the variant similarity by taking one over one plus e to the negative power of the correlation times a scale parameter plus a location parameter; and improve a search efficiency computation by adjusting the related distance metric between the pairs of objects in the set based upon the relative attribute importance and the variant similarity.

16. The computer readable storage medium of claim 15 wherein the utility data includes at least one of choice data or rating data.

17. The computer readable storage medium of claim 15 wherein the plurality of attributes is based upon one or more categorical variables.

18. The computer readable storage medium of claim 15 wherein the plurality of attributes is based upon one or more continuous variables.

19. The computer readable storage medium of claim 15 wherein the correlation between the first type and the second type of attributes is determined across a first user and a second user.

20. The computer readable storage medium of claim 15 wherein the adjusting of the related distance metric between the one or more pairs of objects includes reducing a distance metric between positively correlated attributes of the first or second type.

21. The computer readable storage medium of claim 15 further including clustering the set of objects based upon the adjusted related distance metric between the pairs of objects in the set of objects.

* * * * *